(12) United States Patent
Mercado et al.

(10) Patent No.: US 12,291,869 B2
(45) Date of Patent: May 6, 2025

(54) POLYMER MODIFIED ASPHALT COMPOSITIONS AND RELATED METHODS

(71) Applicant: BMIC LLC, Dallas, TX (US)

(72) Inventors: Ramil Marcelo L. Mercado, Waxahachie, TX (US); Jarod L. Krajca, Ennis, TX (US); Lisa Brzezinski, Red Oak, TX (US); Xiangnan Ye, Cypress, TX (US); Denis M. Tibah, Waxahachie, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/584,797

(22) Filed: Feb. 22, 2024

(65) Prior Publication Data

US 2024/0279930 A1  Aug. 22, 2024

Related U.S. Application Data

(60) Provisional application No. 63/486,395, filed on Feb. 22, 2023.

(51) Int. Cl.
*E04D 1/22* (2006.01)
*C08L 95/00* (2006.01)
*E04D 1/00* (2006.01)

(52) U.S. Cl.
CPC ............ *E04D 1/22* (2013.01); *C08L 95/00* (2013.01); *C08L 2205/03* (2013.01); *E04D 2001/005* (2013.01)

(58) Field of Classification Search
CPC ..... E04D 1/22; E04D 2001/005; C08L 95/00; C08L 2205/03
See application file for complete search history.

(56) References Cited

U.S. PATENT DOCUMENTS

| | | |
|---|---|---|
| 5,888,289 A | 3/1999 | Hendriks et al. |
| 7,317,045 B2 | 1/2008 | Zanchetta et al. |
| 9,267,038 B2 | 2/2016 | Hacker et al. |
| 9,605,152 B2 | 3/2017 | Ruan et al. |
| 11,046,613 B2 | 6/2021 | Davis |
| 11,473,305 B2 | 10/2022 | Latorre et al. |
| 2009/0004387 A1 | 1/2009 | Trumbore et al. |

(Continued)

FOREIGN PATENT DOCUMENTS

| | | |
|---|---|---|
| CA | 1321275 C | 8/1993 |
| WO | WO-2016145188 A1 * | 9/2016 |

OTHER PUBLICATIONS

Wenwei et al, Determination of the vinyl acetate content in ethylene-vinyl acetate copolymers by thermogravimetric analysis, Polymer, vol. 35, Issue 15, Jul. 1994, pp. 3348-3350 (Year: 1994).*

(Continued)

*Primary Examiner* — Nathan L Van Sell
(74) *Attorney, Agent, or Firm* — GREENBERG TRAURG, LLP

(57) ABSTRACT

Polymer modified asphalt compositions for roofing applications and related systems and methods are provided. A polymer modified asphalt composition comprises at least 80% by weight of an asphalt based on a total weight of the polymer modified asphalt composition, a polyolefin having a number average molecular weight of at least 25 kDa, and an ethylene vinyl acetate copolymer.

20 Claims, 3 Drawing Sheets

(56) References Cited

U.S. PATENT DOCUMENTS

2013/0160674 A1* 6/2013 Hong ............... D06N 5/003
                                                106/269
2018/0057686 A1* 3/2018 Williams ............ E01C 7/18
2020/0024454 A1  1/2020 Prejean et al.

OTHER PUBLICATIONS

Marin et al., "Thermal Degradation of Ethylene (Vinyl Acetate) Kinetic analysis of thermogravimetric data," Journal Of Thermal Analysis, vol. 47 (1996) pp. 247-257.

Mat-Shayuti et al., "Thermal properties and morphology of Polypropylene/Polycarbonate/Polypropylene-Graft-Maleic anhydride blends," ICCPE 2016, MATEC Web of Conferences 69, 03001 (2016).

Polyethylene Wax; Wax-Emulsions.com <<http://www.wax-emulsions.com/pe-waxes/#:~:text=The%20molecular%20weight%20(Mn)%20of,up%20to%20140%C2%80C>>.

Polypropylene Wax; Wax-Emulsions.com <<http://www.wax-emulsions.com/ma-g-pp-wax/#:~:text=The%20molecular%20weight%20(Mn)%20of,up%20to%20160%C2%B0C>>.

"Thermal stability of Polyethylene by TGA," Setaram; Organic Materials Sciences Polymers.

Singh et al., "Thermal degradation of SBS in bitumen during storage: Influence of temperature, SBS concentration, polymer type and base bitumen," Polymer Degradation and Stability 147 (2018) 64-75.

* cited by examiner

POLYMER MODIFIED ASPHALT COMPOSITIONS AND RELATED METHODS

CROSS-REFERENCE TO RELATED APPLICATIONS

The present application claims priority to and benefit of U.S. Provisional Patent Application No. 63/486,395, filed Feb. 22, 2023 and entitled "POLYMER-MODIFIED ASPHALT COMPOSITIONS AND RELATED METHODS," the entirety of which is herein incorporated by reference.

FIELD

This disclosure generally relates to polymer modified asphalt compositions for roofing applications and related methods.

BACKGROUND

Due to diminishing asphalt supply, asphalt that would have otherwise been unsuitable for use in roofing applications is modified with poly(styrene-butadiene-styrene) (SBS) to meet applicable roofing standards. A challenge with SBS-modified asphalt compositions is their poor thermal stability. Accordingly, the SBS-modified asphalt compositions must be processed at low temperatures and, at these low temperatures, have high viscosities, which results in numerous manufacturing inefficiencies.

SUMMARY

Some embodiments relate to a roofing shingle. In some embodiments, the roofing shingle comprises a substrate. In some embodiments, the roofing shingle comprises a coating on the substrate. In some embodiments, the coating comprises 10% to 90% by weight of a polymer-modified asphalt composition based on a total weight of the coating. In some embodiments, the polymer-modified asphalt composition comprises at least 80% by weight of an asphalt based on a total weight of the polymer-modified asphalt composition. In some embodiments, the polymer-modified asphalt composition comprises a polyolefin. In some embodiments, the polyolefin has a number average molecular weight of at least 25 kDa. In some embodiments, the polymer-modified asphalt composition comprises an ethylene vinyl acetate copolymer. In some embodiments, the coating comprises 10% to 90% by weight of at least one filler based on the total weight of the coating. In some embodiments, the roofing shingle comprises a plurality of granules on the coating.

In some embodiments, the substrate comprises at least one of a fiberglass mat, a polyester mat, or any combination thereof.

In some embodiments, the polyolefin comprises at least one of a polyethylene, a polypropylene, or any combination thereof.

In some embodiments, the polyolefin has a number average molecular weight of at least 30 kDa.

In some embodiments, the polyolefin has a polydispersity index of 10 or less.

In some embodiments, the ethylene vinyl acetate copolymer has a melt flow index of greater than 6 g/10 min as measured according to ISO 1133.

In some embodiments, the ethylene vinyl acetate copolymer comprises 10% to 40% by weight of vinyl acetate based on a total weight of the ethylene vinyl acetate copolymer.

In some embodiments, the polymer-modified asphalt composition comprises greater than 85% by weight of the asphalt based on the total weight of the polymer-modified asphalt composition.

In some embodiments, the polymer-modified asphalt composition comprises 1% to 15% by weight of the polyolefin based on the total weight of the polymer-modified asphalt composition.

In some embodiments, the polymer-modified asphalt composition comprises 1% to 15% by weight of the ethylene vinyl acetate copolymer.

In some embodiments, the polymer-modified asphalt composition does not comprise a styrene-containing polymer.

In some embodiments, the at least one filler comprises limestone.

In some embodiments, the polymer-modified asphalt composition has a softening point of 190° F. to 320° F., as measured according to ASTM D3462.

In some embodiments, the polymer-modified asphalt composition has a penetration point of 15 dmm or greater at 77° F.

In some embodiments, the polymer-modified asphalt composition has a viscosity of 150 cP to 1000 cP as measured according to ASTM D4402 at 400° F.

Some embodiments relate to a roofing system. In some embodiments, the roofing system comprises a roof substrate. In some embodiments, the roofing system comprises a first roofing shingle. In some embodiments, the roofing system comprises a second roofing shingle. In some embodiments, the first roofing shingle and the second roofing shingle are secured to the roof substrate. In some embodiments, a portion of the first roofing shingle overlaps a portion of the second roofing shingle. In some embodiments, each of the first roofing shingle and the second roofing shingle comprises a substrate. In some embodiments, each of the first roofing shingle and the second roofing shingle comprises a coating on the substrate. In some embodiments, the coating comprises 10% to 90% by weight of a polymer-modified asphalt composition based on a total weight of the coating. In some embodiments, the polymer-modified asphalt composition comprises at least 80% by weight of an asphalt based on a total weight of the polymer-modified asphalt composition. In some embodiments, the polymer-modified asphalt composition comprises a polyolefin. In some embodiments, the polyolefin has a number average molecular weight of at least 25 kDa. In some embodiments, the polymer-modified asphalt composition comprises an ethylene vinyl acetate copolymer. In some embodiments, the coating comprises 10% to 90% by weight of at least one filler based on the total weight of the coating. In some embodiments, each of the first roofing shingle and the second roofing shingle comprises a plurality of granules on the coating.

In some embodiments, the polyolefin has a polydispersity index of 10 or less.

In some embodiments, the ethylene vinyl acetate copolymer has a melt flow index of greater than 6 g/10 min as measured according to ISO 1133.

In some embodiments, the ethylene vinyl acetate copolymer comprises 10% to 40% by weight of vinyl acetate based on a total weight of the ethylene vinyl acetate copolymer.

In some embodiments, the polymer-modified asphalt composition comprises greater than 85% by weight of the asphalt based on the total weight of the polymer-modified asphalt composition.

Some embodiments relate to a method of manufacturing. In some embodiments, the method of manufacturing comprises obtaining a substrate. In some embodiments, the method of manufacturing comprises obtaining a polymer-modified asphalt composition. In some embodiments, the polymer-modified asphalt composition comprises at least 80% by weight of an asphalt based on a total weight of the polymer-modified asphalt composition. In some embodiments, the polymer-modified asphalt composition comprises a polyolefin. In some embodiments, the polyolefin has a number average molecular weight of at least 25 kDa. In some embodiments, the polymer-modified asphalt composition comprises an ethylene vinyl acetate copolymer. In some embodiments, the method of manufacturing comprises obtaining at least one filler. In some embodiments, the method of manufacturing comprises obtaining a plurality of granules. In some embodiments, the method of manufacturing comprises mixing the polymer-modified asphalt composition and the at least one filler in a mixer to obtain a coating. In some embodiments, the coating comprises 10% to 90% by weight of a polymer-modified asphalt composition based on a total weight of the coating. In some embodiments, the coating comprises 10% to 90% by weight of at least one filler based on the total weight of the coating.

In some embodiments, the method of manufacturing comprises applying the coating to at least one surface of the substrate.

In some embodiments, the method of manufacturing comprises applying the plurality of granules to the coating.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
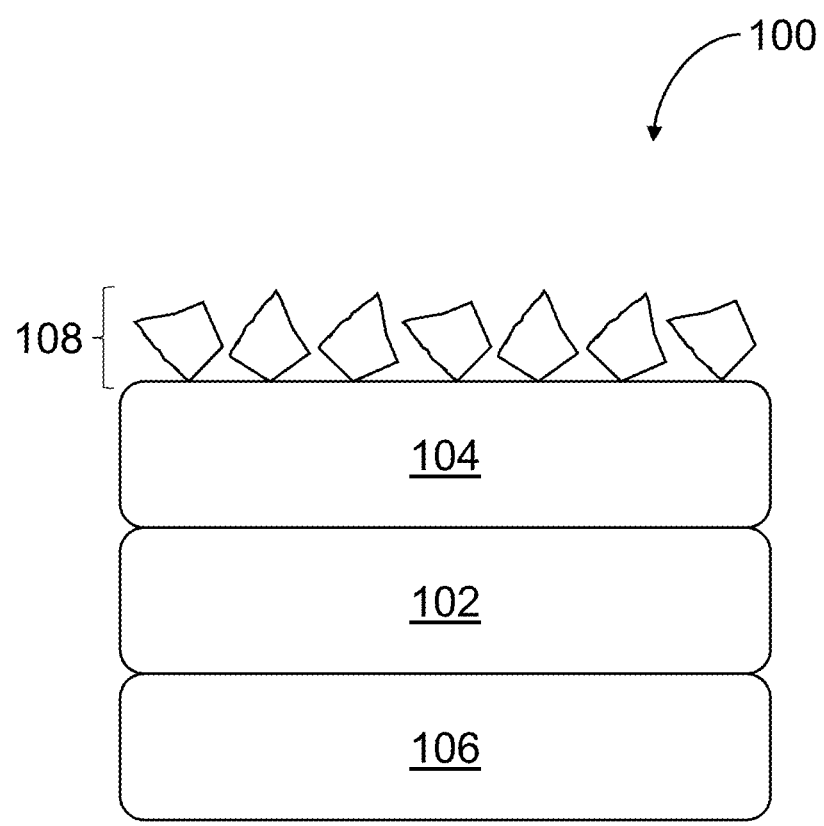
FIG. 1 is a schematic diagram of a roofing material, according to some embodiments.

As used herein, the term "asphalt" refers to an asphalt substance. For example, in some embodiments, an asphalt comprises at least one of a product of petroleum refining, a product of atmospheric distillation, a product of vacuum distillation, a product of a solvent de-asphalting unit, a residue of a vacuum tower bottoms (VTB), a product of a recycled asphalt stream (e.g., re-refined engine oil bottoms), a product of a recycled asphalt process, a product of direct distillation of petroleum, a product of propane deasphalting of petroleum fractions, or any combination thereof.

As used herein, the term "polymer modified asphalt composition" refers to a composition comprising an asphalt and a polymer. A non-limiting example of a polymer modification procedure is mechanical blending, in which at least one polymer is mixed with an asphalt at a sufficient temperature (e.g., from 250° F. to 350° F.) to form a polymer-modified asphalt composition. Other non-limiting examples of polymer modification procedures are described in U.S. Pat. No. 8,901,211, which is incorporated by reference in its entirety. In yet other embodiments, the polymer forms a colloid suspension, colloid solution, or dispersion with the asphalt.

As used herein, the term "oxidized asphalt" refers to an asphalt substance that is (or has been) subjected to an oxidation or air blowing process. For example, in some embodiments, an oxidized asphalt refers to an asphalt substance that is (or has been) subjected to air blowing sufficient to undergo oxidation. A non-limiting example of an oxidation procedure is one in which air is blown into an asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein, the term "unoxidized asphalt" refers to an asphalt substance that is not (or has not been) subjected to an oxidation or air blowing process. For example, in some embodiments, an unoxidized asphalt refers to an asphalt substance that is not (or has not been) subjected to air blowing sufficient to undergo oxidation.

As used herein, the term "polyolefin" refers to a polymer produced from an olefin monomer. In some embodiments, a polyolefin comprises a repeat unit of the formula: $-(CH_2CHR)_n-$, where R is an alkyl. In some embodiments, a polyolefin is a polymer that does not comprise any epoxide.

As used herein, the term "ethylene vinyl acetate copolymer" refers to a copolymer comprising ethylene and vinyl acetate. In some embodiments, an ethylene vinyl acetate copolymer is a copolymer that does not comprise any epoxide.

As used herein, the term "penetration point" or "pen" refers to a vertical distance penetrated by a point of a standard needle into asphalt under specific conditions of load, time, and temperature. In some embodiments, a penetration point is measured at 77° F. according to ASTM D5.

As used herein, the term "softening point" refers to the temperature at which a material softens beyond a predetermined reference softness. In some embodiments, softening point is measured herein according to ASTM D3461.

As used herein, the term "viscosity" refers to a measure of a fluid's resistance to flow at a given shear rate and temperature. Viscosity is measured herein in accordance with ASTM D-4402.

As used herein, the term "number average molecular weight" refers to an average molecular weight of polymer molecules. In some embodiments, the number average molecular weight is calculated as the sum of the individual molecular weights of n polymer molecules divided by the total number of polymer molecules, n. In some embodiments, the number average molecular weight is measured using gel permeation chromatography. Other techniques for measuring number average molecular weight include, for example and without limitation, viscometry via Mark-Houwink equation, vapor pressure osmometry, and $^1H$ NMR, among others.

As used herein, the term "weight average molecular weight" refers to a weighted average molecular weight of polymer molecules. In some embodiments, the weight average molecular weight is calculated by multiplying the weight fraction ($W_i$) for each polymer molecule i times the mass of each polymer molecule i, and then summing the resulting multiplication products for each of the polymer molecules i to arrive at the weight average molecular weight. In some embodiments, the weight average molecular weight is measured using gel permeation chromatography. Other techniques for measuring weight average molecular weight include, for example and without limitation, static light scattering, small angle neutron scattering, X-ray scattering, and sedimentation velocity, among others.

As used herein, the term "polydispersity" refers to a distribution of molecular weights of polymers for a given polymer sample. A polydispersity of one (1) refers to a polymer sample comprising polymers of uniform molecular weight. The polydispersity can be calculated by dividing the weight average molecular weight by the number average molecular weight of polymers in the polymer sample.

Polymer-modified asphalt compositions for roofing applications are provided. In some embodiments, the polymer-modified asphalt compositions are based on asphalt compositions that are not suitable for use in roofing applications. In some embodiments, polymers are combined with the asphalt compositions to modify the properties of asphalt compositions such that the resulting polymer-modified asphalt composition may be used on or in roofing materials, such as, for example and without limitation, roofing shingles, roofing membranes, and the like. In some embodiments, the polymer-modified asphalt compositions have improved thermal stability, so as to allow the polymer-modified asphalt compositions to be processed at higher temperatures and lower viscosities. In some embodiments, the improved thermal stability has at least the advantage of increasing production rates by increasing manufacturing line speeds, among other things.

Some embodiments relate to a roofing material. In some embodiments, the roofing material comprises a roofing shingle. In some embodiments, the roofing shingle is a three-tab shingle. In some embodiments, the roofing shingle is a laminated shingle. In some embodiments, the roofing shingle is a strip shingle. In some embodiments, the roofing material comprises a roofing membrane. In some embodiments, the roofing material comprises a roofing underlayment. In some embodiments, the roofing material comprises a roofing tile. In some embodiments, the roofing material comprises a rolled roofing. In some embodiments, the roofing material comprises a flexible rolled roofing. In some embodiments, the roofing material comprises a roofing substrate. In some embodiments, the roofing substrate comprises at least one of a plywood substrate, a glass substrate, a cellulosic substrate, a woven mat, a nonwoven a fabric, a glass mat, a fiberglass mat, a polyester mat, a scrim, a coated scrim, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof.

In some embodiments, the roofing material comprises a substrate. In some embodiments, the substrate comprises a woven mat. In some embodiments, the substrate comprises a nonwoven mat. In some embodiments, the substrate comprises a fiberglass mat. In some embodiments, the substrate comprises a polyester mat. In some embodiments, the substrate comprises a scrim. In some embodiments, the substrate comprises a coated scrim. In some embodiments, the substrate comprises at least one of the roofing substrates. That is, for example, in some embodiments, the substrate comprises at least one of a plywood substrate, a glass substrate, a cellulosic substrate, a woven mat, a nonwoven a fabric, a glass mat, a fiberglass mat, a polyester mat, a scrim, a coated scrim, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof.

In some embodiments, the coating comprises a polymer-modified asphalt composition. In some embodiments, the coating comprises 10% to 90% by weight of the polymer-modified asphalt composition based on a total weight of the coating. In some embodiments, the coating comprises 15% to 90% by weight of the polymer-modified asphalt composition based on the total weight of the coating. In some embodiments, the coating comprises 20% to 90% by weight of the polymer-modified asphalt composition based on the total weight of the coating. In some embodiments, the coating comprises 25% to 90% by weight of the polymer-modified asphalt composition based on the total weight of the coating. In some embodiments, the coating comprises 30% to 90% by weight of the polymer-modified asphalt composition based on the total weight of the coating. In some embodiments, the coating comprises 35% to 90% by weight of the polymer-modified asphalt composition based on the total weight of the coating. In some embodiments, the coating comprises 40% to 90% by weight of the polymer-modified asphalt composition based on the total weight of the coating. In some embodiments, the coating comprises 45% to 90% by weight of the polymer-modified asphalt composition based on the total weight of the coating. In some embodiments, the coating comprises 50% to 90% by weight of the polymer-modified asphalt composition based on the total weight of the coating. In some embodiments, the coating comprises 55% to 90% by weight of the polymer-modified asphalt composition based on the total weight of the coating. In some embodiments, the coating comprises 60% to 90% by weight of the polymer-modified asphalt composition based on the total weight of the coating. In some embodiments, the coating comprises 65% to 90% by weight of the polymer-modified asphalt composition based on the total weight of the coating. In some embodiments, the coating comprises 70% to 90% by weight of the polymer-modified asphalt composition based on the total weight of the coating. In some embodiments, the coating comprises 75% to 90% by weight of the polymer-modified asphalt composition based on the total weight of the coating. In some embodiments, the coating comprises 80% to 90% by weight of the polymer-modified asphalt composition based on the total weight of the coating. In some embodiments, the coating comprises 85% to 90% by weight of the polymer-modified asphalt composition based on the total weight of the coating.

In some embodiments, the coating comprises 10% to 85% by weight of the polymer-modified asphalt composition based on the total weight of the coating. In some embodiments, the coating comprises 10% to 80% by weight of the polymer-modified asphalt composition based on the total weight of the coating. In some embodiments, the coating comprises 10% to 75% by weight of the polymer-modified asphalt composition based on the total weight of the coating. In some embodiments, the coating comprises 10% to 70% by weight of the polymer-modified asphalt composition based on the total weight of the coating. In some embodiments, the coating comprises 10% to 65% by weight of the polymer-modified asphalt composition based on the total weight of the coating. In some embodiments, the coating comprises 10% to 60% by weight of the polymer-modified asphalt composition based on the total weight of the coating. In some embodiments, the coating comprises 10% to 55% by weight of the polymer-modified asphalt composition based on the total weight of the coating. In some embodiments, the coating comprises 10% to 50% by weight of the polymer-modified asphalt composition based on the total weight of the coating. In some embodiments, the coating comprises 10% to 45% by weight of the polymer-modified asphalt composition based on the total weight of the coating. In some embodiments, the coating comprises 10% to 40% by weight of the polymer-modified asphalt composition based on the total weight of the coating. In some embodiments, the coating comprises 10% to 35% by weight of the polymer-modified asphalt composition based on the total weight of the coating. In some embodiments, the coating comprises 10% to 30% by weight of the polymer-modified asphalt composition based on the total weight of the coating. In some embodiments, the coating comprises 10% to 25% by weight of the polymer-modified asphalt composition based on the total weight of the coating. In some embodiments, the coating comprises 10% to 20% by weight of the polymer-modified asphalt composition based on the total weight of the coating. In some embodiments, the coating comprises 10% to 15% by weight of the polymer-modified asphalt composition based on the total weight of the coating.

In some embodiments, the polymer-modified asphalt composition comprises an asphalt. In some embodiments, the polymer-modified asphalt composition comprises greater than 80% by weight of the asphalt based on a total weight of the coating. In some embodiments, the polymer-modified asphalt composition comprises greater than 81% by weight of the asphalt based on the total weight of the polymer-modified asphalt composition. In some embodiments, the polymer-modified asphalt composition comprises greater than 82% by weight of the asphalt based on the total weight of the polymer-modified asphalt composition. In some embodiments, the polymer-modified asphalt composition comprises greater than 83% by weight of the asphalt based on the total weight of the polymer-modified asphalt composition. In some embodiments, the polymer-modified asphalt composition comprises greater than 84% by weight of the asphalt based on the total weight of the polymer-modified asphalt composition. In some embodiments, the polymer-modified asphalt composition comprises greater than 85% by weight of the asphalt based on the total weight of the polymer-modified asphalt composition. In some embodiments, the polymer-modified asphalt composition comprises greater than 86% by weight of the asphalt based on the total weight of the polymer-modified asphalt composition. In some embodiments, the polymer-modified asphalt composition comprises greater than 87% by weight of the asphalt based on the total weight of the polymer-modified asphalt composition. In some embodiments, the polymer-modified asphalt composition comprises greater than 88% by weight of the asphalt based on the total weight of the polymer-modified asphalt composition. In some embodiments, the polymer-modified asphalt composition comprises greater than 89% by weight of the asphalt based on the total weight of the polymer-modified asphalt composition. In some embodiments, the polymer-modified asphalt composition comprises greater than 90% by weight of the asphalt based on the total weight of the polymer-modified asphalt composition. In some embodiments, the polymer-modified asphalt composition comprises greater than 91% by weight of the asphalt based on the total weight of the polymer-modified asphalt composition. In some embodiments, the polymer-modified asphalt composition comprises greater than 92% by weight of the asphalt based on the total weight of the polymer-modified asphalt composition. In some embodiments, the polymer-modified asphalt composition comprises greater than 93% by weight of the asphalt based on the total weight of the polymer-modified asphalt composition. In some embodiments, the polymer-modified asphalt composition comprises greater than 94% by weight of the asphalt based on the total weight of the polymer-modified asphalt composition.

In some embodiments, the polymer-modified asphalt composition comprises 80% to 95% by weight of the asphalt based on the total weight of the polymer-modified asphalt composition. In some embodiments, the polymer-modified asphalt composition comprises 81% to 95% by weight of the asphalt based on the total weight of the polymer-modified asphalt composition. In some embodiments, the polymer-modified asphalt composition comprises 82% to 95% by weight of the asphalt based on the total weight of the polymer-modified asphalt composition. In some embodiments, the polymer-modified asphalt composition comprises 83% to 95% by weight of the asphalt based on the total weight of the polymer-modified asphalt composition. In some embodiments, the polymer-modified asphalt composition comprises 84% to 95% by weight of the asphalt based on the total weight of the polymer-modified asphalt composition. In some embodiments, the polymer-modified asphalt composition comprises 85% to 95% by weight of the asphalt based on the total weight of the polymer-modified asphalt composition. In some embodiments, the polymer-modified asphalt composition comprises 86% to 95% by weight of the asphalt based on the total weight of the polymer-modified asphalt composition. In some embodiments, the polymer-modified asphalt composition comprises 87% to 95% by weight of the asphalt based on the total weight of the polymer-modified asphalt composition. In some embodiments, the polymer-modified asphalt composition comprises 88% to 95% by weight of the asphalt based on the total weight of the polymer-modified asphalt composition. In some embodiments, the polymer-modified asphalt composition comprises 89% to 95% by weight of the asphalt based on the total weight of the polymer-modified asphalt composition. In some embodiments, the polymer-modified asphalt composition comprises 90% to 95% by weight of the asphalt based on the total weight of the polymer-modified asphalt composition. In some embodiments, the polymer-modified asphalt composition comprises 91% to 95% by weight of the asphalt based on the total weight of the polymer-modified asphalt composition. In some embodiments, the polymer-modified asphalt composition comprises 92% to 95% by weight of the asphalt based on the total weight of the polymer-modified asphalt composition. In some embodiments, the polymer-modified asphalt composition comprises 93% to 95% by weight of the asphalt based on the total weight of the polymer-modified asphalt composition. In some embodiments, the polymer-modified asphalt composition comprises 94% to 95% by weight of the asphalt based on the total weight of the polymer-modified asphalt composition.

In some embodiments, the polymer-modified asphalt composition comprises 80% to 94% by weight of the asphalt based on the total weight of the polymer-modified asphalt composition. In some embodiments, the polymer-modified asphalt composition comprises 80% to 93% by weight of the asphalt based on the total weight of the polymer-modified asphalt composition. In some embodiments, the polymer-modified asphalt composition comprises 80% to 92% by weight of the asphalt based on the total weight of the polymer-modified asphalt composition. In some embodiments, the polymer-modified asphalt composition comprises 80% to 91% by weight of the asphalt based on the total weight of the polymer-modified asphalt composition. In some embodiments, the polymer-modified asphalt composition comprises 80% to 90% by weight of the asphalt based on the total weight of the polymer-modified asphalt composition. In some embodiments, the polymer-modified asphalt composition comprises 80% to 89% by weight of the asphalt based on the total weight of the polymer-modified asphalt composition. In some embodiments, the polymer-modified asphalt composition comprises 80% to 88% by weight of the asphalt based on the total weight of the polymer-modified asphalt composition. In some embodiments, the polymer-modified asphalt composition comprises 80% to 87% by weight of the asphalt based on the total weight of the polymer-modified asphalt composition. In some embodiments, the polymer-modified asphalt composition comprises 80% to 86% by weight of the asphalt based on the total weight of the polymer-modified asphalt composition. In some embodiments, the polymer-modified asphalt composition comprises 80% to 85% by weight of the asphalt based on the total weight of the polymer-modified asphalt composition. In some embodiments, the polymer-modified asphalt composition comprises 80% to 84% by weight of the asphalt based on the total weight of the polymer-modified asphalt composition. In some embodiments, the polymer-modified asphalt composition comprises 80% to 83% by weight of the asphalt based on the total weight of the polymer-modified asphalt composition. In some embodiments, the polymer-modified asphalt composition comprises 80% to 82% by weight of the asphalt based on the total weight of the polymer-modified asphalt composition. In some embodiments, the polymer-modified asphalt composition comprises 80% to 81% by weight of the asphalt based on the total weight of the polymer-modified asphalt composition.

In some embodiments, the polymer-modified asphalt composition comprises 85% to 94% by weight of the asphalt based on the total weight of the polymer-modified asphalt composition. In some embodiments, the polymer-modified asphalt composition comprises 85% to 93% by weight of the asphalt based on the total weight of the polymer-modified asphalt composition. In some embodiments, the polymer-modified asphalt composition comprises 85% to 92% by weight of the asphalt based on the total weight of the polymer-modified asphalt composition. In some embodiments, the polymer-modified asphalt composition comprises 85% to 91% by weight of the asphalt based on the total weight of the polymer-modified asphalt composition. In some embodiments, the polymer-modified asphalt composition comprises 85% to 90% by weight of the asphalt based on the total weight of the polymer-modified asphalt composition. In some embodiments, the polymer-modified asphalt composition comprises 85% to 89% by weight of the asphalt based on the total weight of the polymer-modified asphalt composition. In some embodiments, the polymer-modified asphalt composition comprises 85% to 88% by weight of the asphalt based on the total weight of the polymer-modified asphalt composition. In some embodiments, the polymer-modified asphalt composition comprises 85% to 87% by weight of the asphalt based on the total weight of the polymer-modified asphalt composition. In some embodiments, the polymer-modified asphalt composition comprises 85% to 86% by weight of the asphalt based on the total weight of the polymer-modified asphalt composition.

In some embodiments, the polymer-modified asphalt composition comprises greater than 85% to 94% by weight of the asphalt based on the total weight of the polymer-modified asphalt composition. In some embodiments, the polymer-modified asphalt composition comprises greater than 85% to 93% by weight of the asphalt based on the total weight of the polymer-modified asphalt composition. In some embodiments, the polymer-modified asphalt composition comprises greater than 85% to 92% by weight of the asphalt based on the total weight of the polymer-modified asphalt composition. In some embodiments, the polymer-modified asphalt composition comprises greater than 85% to 91% by weight of the asphalt based on the total weight of the polymer-modified asphalt composition. In some embodiments, the polymer-modified asphalt composition comprises greater than 85% to 90% by weight of the asphalt based on the total weight of the polymer-modified asphalt composition. In some embodiments, the polymer-modified asphalt composition comprises greater than 85% to 89% by weight of the asphalt based on the total weight of the polymer-modified asphalt composition. In some embodiments, the polymer-modified asphalt composition comprises greater than 85% to 88% by weight of the asphalt based on the total weight of the polymer-modified asphalt composition. In some embodiments, the polymer-modified asphalt composition comprises greater than 85% to 87% by weight of the asphalt based on the total weight of the polymer-modified asphalt composition. In some embodiments, the polymer-modified asphalt composition comprises greater than 85% to 86% by weight of the asphalt based on the total weight of the polymer-modified asphalt composition.

In some embodiments, the polymer-modified asphalt composition comprises a polyolefin. In some embodiments, the polymer-modified asphalt composition comprises 1% to 15% by weight of the polyolefin based on the total weight of the polymer-modified asphalt composition. In some embodiments, the polymer-modified asphalt composition comprises 1% to 14% by weight of the polyolefin based on the total weight of the polymer-modified asphalt composition. In some embodiments, the polymer-modified asphalt composition comprises 1% to 13% by weight of the polyolefin based on the total weight of the polymer-modified asphalt composition. In some embodiments, the polymer-modified asphalt composition comprises 1% to 12% by weight of the polyolefin based on the total weight of the polymer-modified asphalt composition. In some embodiments, the polymer-modified asphalt composition comprises 1% to 11% by weight of the polyolefin based on the total weight of the polymer-modified asphalt composition. In some embodiments, the polymer-modified asphalt composition comprises 1% to 10% by weight of the polyolefin based on the total weight of the polymer-modified asphalt composition. In some embodiments, the polymer-modified asphalt composition comprises 1% to 9% by weight of the polyolefin based on the total weight of the polymer-modified asphalt composition. In some embodiments, the polymer-modified asphalt composition comprises 1% to 8% by weight of the polyolefin based on the total weight of the polymer-modified asphalt composition. In some embodiments, the polymer-modified asphalt composition comprises 1% to 7% by weight of the polyolefin based on the total weight of the polymer-modified asphalt composition. In some embodiments, the polymer-modified asphalt composition comprises 1% to 6% by weight of the polyolefin based on the total weight of the polymer-modified asphalt composition. In some embodiments, the polymer-modified asphalt composition comprises 1% to 5% by weight of the polyolefin based on the total weight of the polymer-modified asphalt composition. In some embodiments, the polymer-modified asphalt composition comprises 1% to 4% by weight of the polyolefin based on the total weight of the polymer-modified asphalt composition. In some embodiments, the polymer-modified asphalt composition comprises 1% to 3% by weight of the polyolefin based on the total weight of the polymer-modified asphalt composition. In some embodiments, the polymer-modified asphalt composition comprises 1% to 2% by weight of the polyolefin based on the total weight of the polymer-modified asphalt composition.

In some embodiments, the polymer-modified asphalt composition comprises 2% to 15% by weight of the polyolefin based on the total weight of the polymer-modified asphalt composition. In some embodiments, the polymer-modified asphalt composition comprises 3% to 15% by weight of the polyolefin based on the total weight of the polymer-modified asphalt composition. In some embodiments, the polymer-modified asphalt composition comprises 4% to 15% by weight of the polyolefin based on the total weight of the polymer-modified asphalt composition. In some embodiments, the polymer-modified asphalt composition comprises 5% to 15% by weight of the polyolefin based on the total weight of the polymer-modified asphalt composition. In some embodiments, the polymer-modified asphalt composition comprises 6% to 15% by weight of the polyolefin based on the total weight of the polymer-modified asphalt composition. In some embodiments, the polymer-modified asphalt composition comprises 7% to 15% by weight of the polyolefin based on the total weight of the polymer-modified asphalt composition. In some embodiments, the polymer-modified asphalt composition comprises 8% to 15% by weight of the polyolefin based on the total weight of the polymer-modified asphalt composition. In some embodiments, the polymer-modified asphalt composition comprises 9% to 15% by weight of the polyolefin based on the total weight of the polymer-modified asphalt composition. In some embodiments, the polymer-modified asphalt composition comprises 10% to 15% by weight of the polyolefin based on the total weight of the polymer-modified asphalt composition. In some embodiments, the polymer-modified asphalt composition comprises 11% to 15% by weight of the polyolefin based on the total weight of the polymer-modified asphalt composition. In some embodiments, the polymer-modified asphalt composition comprises 12% to 15% by weight of the polyolefin based on the total weight of the polymer-modified asphalt composition. In some embodiments, the polymer-modified asphalt composition comprises 13% to 15% by weight of the polyolefin based on the total weight of the polymer-modified asphalt composition. In some embodiments, the polymer-modified asphalt composition comprises 14% to 15% by weight of the polyolefin based on the total weight of the polymer-modified asphalt composition.

In some embodiments, the polymer-modified asphalt composition comprises 2% to 10% by weight of the polyolefin based on the total weight of the polymer-modified asphalt composition. In some embodiments, the polymer-modified asphalt composition comprises 3% to 10% by weight of the polyolefin based on the total weight of the polymer-modified asphalt composition. In some embodiments, the polymer-modified asphalt composition comprises 4% to 10% by weight of the polyolefin based on the total weight of the polymer-modified asphalt composition. In some embodiments, the polymer-modified asphalt composition comprises 5% to 10% by weight of the polyolefin based on the total weight of the polymer-modified asphalt composition. In some embodiments, the polymer-modified asphalt composition comprises 6% to 10% by weight of the polyolefin based on the total weight of the polymer-modified asphalt composition. In some embodiments, the polymer-modified asphalt composition comprises 7% to 10% by weight of the polyolefin based on the total weight of the polymer-modified asphalt composition. In some embodiments, the polymer-modified asphalt composition comprises 8% to 10% by weight of the polyolefin based on the total weight of the polymer-modified asphalt composition. In some embodiments, the polymer-modified asphalt composition comprises 9% to 10% by weight of the polyolefin based on the total weight of the polymer-modified asphalt composition.

In some embodiments, the polymer-modified asphalt composition comprises an ethylene vinyl acetate copolymer. In some embodiments, the polymer-modified asphalt composition comprises 1% to 15% by weight of the ethylene vinyl acetate copolymer based on the total weight of the polymer-modified asphalt composition. In some embodiments, the polymer-modified asphalt composition comprises 1% to 14% by weight of the ethylene vinyl acetate copolymer based on the total weight of the polymer-modified asphalt composition. In some embodiments, the polymer-modified asphalt composition comprises 1% to 13% by weight of the ethylene vinyl acetate copolymer based on the total weight of the polymer-modified asphalt composition. In some embodiments, the polymer-modified asphalt composition comprises 1% to 12% by weight of the ethylene vinyl acetate copolymer based on the total weight of the polymer-modified asphalt composition. In some embodiments, the polymer-modified asphalt composition comprises 1% to 11% by weight of the ethylene vinyl acetate copolymer based on the total weight of the polymer-modified asphalt composition. In some embodiments, the polymer-modified asphalt composition comprises 1% to 10% by weight of the ethylene vinyl acetate copolymer based on the total weight of the polymer-modified asphalt composition. In some embodiments, the polymer-modified asphalt composition comprises 1% to 9% by weight of the ethylene vinyl acetate copolymer based on the total weight of the polymer-modified asphalt composition. In some embodiments, the polymer-modified asphalt composition comprises 1% to 8% by weight of the ethylene vinyl acetate copolymer based on the total weight of the polymer-modified asphalt composition. In some embodiments, the polymer-modified asphalt composition comprises 1% to 7% by weight of the ethylene vinyl acetate copolymer based on the total weight of the polymer-modified asphalt composition. In some embodiments, the polymer-modified asphalt composition comprises 1% to 6% by weight of the ethylene vinyl acetate copolymer based on the total weight of the polymer-modified asphalt composition. In some embodiments, the polymer-modified asphalt composition comprises 1% to 5% by weight of the ethylene vinyl acetate copolymer based on the total weight of the polymer-modified asphalt composition. In some embodiments, the polymer-modified asphalt composition comprises 1% to 4% by weight of the ethylene vinyl acetate copolymer based on the total weight of the polymer-modified asphalt composition. In some embodiments, the polymer-modified asphalt composition comprises 1% to 3% by weight of the ethylene vinyl acetate copolymer based on the total weight of the polymer-modified asphalt composition. In some embodiments, the polymer-modified asphalt composition comprises 1% to 2% by weight of the ethylene vinyl acetate copolymer based on the total weight of the polymer-modified asphalt composition.

In some embodiments, the polymer-modified asphalt composition comprises 2% to 15% by weight of the ethylene vinyl acetate copolymer based on the total weight of the polymer-modified asphalt composition. In some embodiments, the polymer-modified asphalt composition comprises 3% to 15% by weight of the ethylene vinyl acetate copolymer based on the total weight of the polymer-modified asphalt composition. In some embodiments, the polymer-modified asphalt composition comprises 4% to 15% by weight of the ethylene vinyl acetate copolymer based on the total weight of the polymer-modified asphalt composition. In some embodiments, the polymer-modified asphalt composition comprises 5% to 15% by weight of the ethylene vinyl acetate copolymer based on the total weight of the polymer-modified asphalt composition. In some embodiments, the polymer-modified asphalt composition comprises 6% to 15% by weight of the ethylene vinyl acetate copolymer based on the total weight of the polymer-modified asphalt composition. In some embodiments, the polymer-modified asphalt composition comprises 7% to 15% by weight of the ethylene vinyl acetate copolymer based on the total weight of the polymer-modified asphalt composition. In some embodiments, the polymer-modified asphalt composition comprises 8% to 15% by weight of the ethylene vinyl acetate copolymer based on the total weight of the polymer-modified asphalt composition. In some embodiments, the polymer-modified asphalt composition comprises 9% to 15% by weight of the ethylene vinyl acetate copolymer based on the total weight of the polymer-modified asphalt composition. In some embodiments, the polymer-modified asphalt composition comprises 10% to 15% by weight of the ethylene vinyl acetate copolymer based on the total weight of the polymer-modified asphalt composition. In some embodiments, the polymer-modified asphalt composition comprises 11% to 15% by weight of the ethylene vinyl acetate copolymer based on the total weight of the polymer-modified asphalt composition. In some embodiments, the polymer-modified asphalt composition comprises 12% to 15% by weight of the ethylene vinyl acetate copolymer based on the total weight of the polymer-modified asphalt composition. In some embodiments, the polymer-modified asphalt composition comprises 13% to 15% by weight of the ethylene vinyl acetate copolymer based on the total weight of the polymer-modified asphalt composition. In some embodiments, the polymer-modified asphalt composition comprises 14% to 15% by weight of the ethylene vinyl acetate copolymer based on the total weight of the polymer-modified asphalt composition.

In some embodiments, the polymer-modified asphalt composition comprises 2% to 10% by weight of the ethylene vinyl acetate copolymer based on the total weight of the polymer-modified asphalt composition. In some embodiments, the polymer-modified asphalt composition comprises 3% to 10% by weight of the ethylene vinyl acetate copolymer based on the total weight of the polymer-modified asphalt composition. In some embodiments, the polymer-modified asphalt composition comprises 4% to 10% by weight of the ethylene vinyl acetate copolymer based on the total weight of the polymer-modified asphalt composition. In some embodiments, the polymer-modified asphalt composition comprises 5% to 10% by weight of the ethylene vinyl acetate copolymer based on the total weight of the polymer-modified asphalt composition. In some embodiments, the polymer-modified asphalt composition comprises 6% to 10% by weight of the ethylene vinyl acetate copolymer based on the total weight of the polymer-modified asphalt composition. In some embodiments, the polymer-modified asphalt composition comprises 7% to 10% by weight of the ethylene vinyl acetate copolymer based on the total weight of the polymer-modified asphalt composition. In some embodiments, the polymer-modified asphalt composition comprises 8% to 10% by weight of the ethylene vinyl acetate copolymer based on the total weight of the polymer-modified asphalt composition. In some embodiments, the polymer-modified asphalt composition comprises 9% to 10% by weight of the ethylene vinyl acetate copolymer based on the total weight of the polymer-modified asphalt composition.

In some embodiments, the asphalt comprises at least one of a product of petroleum refining, a product of atmospheric distillation, a product of vacuum distillation, a product of a solvent de-asphalting unit, a residue of a vacuum tower bottoms (VTB), a product of a recycled asphalt stream (e.g., re-refined engine oil bottoms), a product of a recycled asphalt process, a product of direct distillation of petroleum, a product of propane deasphalting of petroleum fractions, or any combination thereof. In some embodiments, the asphalt comprises at least one of an unoxidized asphalt. In some embodiments, the asphalt comprises a waste asphalt. In some embodiments, the asphalt comprises an unoxidized asphalt. For example, in some embodiments, the asphalt comprises at least one of a hot mix asphalt, a warm mix asphalt, a cold mix asphalt, a sheet asphalt, a high-modulus asphalt, or any combination thereof. In some embodiments, the asphalt comprises a roofing flux. In some embodiments, the asphalt comprises a paving grade asphalt. Non-limiting examples of paving grade asphalts include, without limitation, at least one of paving grade (PG) 64-22, AC20, PG 67-22, PG 70-22, PG 58-22, PG 58-28, PG 58-22, PG 70-16, PG 70-10, PG 67-10, PG 46-34, PG 52-34, PG 52-28, PG 64-16, PG 64-10, PG 70-28, PG 70-22, PG 76-28, PG 76-22, PG 76-16, PG 76-10, pen grade 50/70, pen grade 60/90, pen grade 80/100, pen grade 80/120, pen grade 120/150, pen grade 40/50, pen grade 60/70, pen grade 85/100, pen grade 120/150, AR4000, AR8000, AC/30 grade, or any combination thereof. In some embodiments, the asphalt does not comprise an oxidized asphalt. In some embodiments, the polymer modified asphalt composition does not comprise an oxidized asphalt.

In some embodiments, the asphalt has a penetration point of less than 60 dmm at 77° F. In some embodiments, the asphalt has a penetration point of 20 dmm to less than 60 dmm at 77° F. In some embodiments, the asphalt has a penetration point of 25 dmm to less than 60 dmm at 77° F. In some embodiments, the asphalt has a penetration point of 30 dmm to less than 60 dmm at 77° F. In some embodiments, the asphalt has a penetration point of 35 dmm to less than 60 dmm at 77° F. In some embodiments, the asphalt has a penetration point of 40 dmm to less than 60 dmm at 77° F. In some embodiments, the asphalt has a penetration point of 45 dmm to less than 60 dmm at 77° F. In some embodiments, the asphalt has a penetration point of 55 dmm to less than 60 dmm at 77° F. In some embodiments, the asphalt has a penetration point of 20 dmm to 55 dmm at 77° F. In some embodiments, the asphalt has a penetration point of 20 dmm to 50 dmm at 77° F. In some embodiments, the asphalt has a penetration point of 20 dmm to 45 dmm at 77° F. In some embodiments, the asphalt has a penetration point of 20 dmm to 40 dmm at 77° F. In some embodiments, the asphalt has a penetration point of 20 dmm to 35 dmm at 77° F. In some embodiments, the asphalt has a penetration point of 20 dmm to 30 dmm at 77° F. In some embodiments, the asphalt has a penetration point of 20 dmm to 25 dmm at 77° F.

In some embodiments, the asphalt has a penetration point of 60 dmm to 400 dmm at 77° F. In some embodiments, the asphalt has a penetration point of 80 dmm to 400 dmm at 77° F. In some embodiments, the asphalt has a penetration point of 100 dmm to 400 dmm at 77° F. In some embodiments, the asphalt has a penetration point of 120 dmm to 400 dmm at 77° F. In some embodiments, the asphalt has a penetration point of 140 dmm to 400 dmm at 77° F. In some embodiments, the asphalt has a penetration point of 160 dmm to 400 dmm at 77° F. In some embodiments, the asphalt has a penetration point of 180 dmm to 400 dmm at 77° F. In some embodiments, the asphalt has a penetration point of 200 dmm to 400 dmm at 77° F. In some embodiments, the asphalt has a penetration point of 220 dmm to 400 dmm at 77° F. In some embodiments, the asphalt has a penetration point of 240 dmm to 400 dmm at 77° F. In some embodiments, the asphalt has a penetration point of 260 dmm to 400 dmm at 77° F. In some embodiments, the asphalt has a penetration point of 280 dmm to 400 dmm at 77° F. In some embodiments, the asphalt has a penetration point of 300 dmm to 400 dmm at 77° F. In some embodiments, the asphalt has a penetration point of 320 dmm to 400 dmm at 77° F. In some embodiments, the asphalt has a penetration point of 340 dmm to 400 dmm at 77° F. In some embodiments, the asphalt has a penetration point of 360 dmm to 400 dmm at 77° F. In some embodiments, the asphalt has a penetration point of 380 dmm to 400 dmm at 77° F.

In some embodiments, the asphalt has a penetration point of 60 dmm to 380 dmm at 77° F. In some embodiments, the asphalt has a penetration point of 60 dmm to 360 dmm at 77° F. In some embodiments, the asphalt has a penetration point of 60 dmm to 340 dmm at 77° F. In some embodiments, the asphalt has a penetration point of 60 dmm to 320 dmm at 77° F. In some embodiments, the asphalt has a penetration point of 60 dmm to 300 dmm at 77° F. In some embodiments, the asphalt has a penetration point of 60 dmm to 280 dmm at 77° F. In some embodiments, the asphalt has a penetration point of 60 dmm to 260 dmm at 77° F. In some embodiments, the asphalt has a penetration point of 60 dmm to 240 dmm at 77° F. In some embodiments, the asphalt has a penetration point of 60 dmm to 220 dmm at 77° F. In some embodiments, the asphalt has a penetration point of 60 dmm to 200 dmm at 77° F. In some embodiments, the asphalt has a penetration point of 60 dmm to 180 dmm at 77° F. In some embodiments, the asphalt has a penetration point of 60 dmm to 160 dmm at 77° F. In some embodiments, the asphalt has a penetration point of 60 dmm to 140 dmm at 77° F. In some embodiments, the asphalt has a penetration point of 60 dmm to 120 dmm at 77° F. In some embodiments, the asphalt has a penetration point of 60 dmm to 100 dmm at 77° F. In some embodiments, the asphalt has a penetration point of 60 dmm to 80 dmm at 77° F.

In some embodiments, the polyolefin comprises at least one of polyethylene, polypropylene, any copolymer thereof, any homopolymer thereof, any polymer blend thereof, or any combination thereof. In some embodiments, the polyolefin comprises at least one of a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the polyolefin comprises at least one of a copolymer comprising ethylene and octene, a copolymer comprising ethylene and hexane, a copolymer comprising ethylene and butene, a low density polyethylene (LDPE), a raw or recycled low density polyethylene (rLDPE), a linear low density polyethylene (LLDPE), a very low density polyethylene (VLDPE), an ultra-low density polyethylene (ULDPE), a medium density polyethylene (MDPE), a high density polyethylene (HDPE)), an isotactic polypropylene (IPP), an atactic polypropylene (APP), an amorphous poly-alpha olefin (APAO), an amorphous polyolefin (APO), or any combination thereof. In some embodiments, the polyolefin is an olefin block copolymer, wherein the olefin block copolymer comprises at least one of ethylene-1-octene copolymer, propylene-ethylene copolymer, ethylene-1-butene copolymer, propylene-ethylene-1-butene copolymer, ethylene-1-hexene copolymer, ethylene-1-octene copolymer, ethylene-1-hexene-1-octene copolymer, propylene-ethylene-1-hexene copolymer, propylene-ethylene-1-octene copolymer, ethylene-1-butene-1-octene copolymer, or any combination thereof. In some embodiments, the polyolefin comprises a polyisobutylene, an ethylene propylene rubber, an ethylene propylene diene monomer rubber, or any combination thereof.

Examples of the polymer include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvaloy®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex® P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

In some embodiments, the ethylene vinyl acetate copolymer comprises 10% to 60% by weight of vinyl acetate based on a total weight of the ethylene vinyl acetate copolymer. In some embodiments, the ethylene vinyl acetate copolymer comprises 15% to 60% by weight of vinyl acetate based on the total weight of the ethylene vinyl acetate copolymer. In some embodiments, the ethylene vinyl acetate copolymer comprises 20% to 60% by weight of vinyl acetate based on the total weight of the ethylene vinyl acetate copolymer. In some embodiments, the ethylene vinyl acetate copolymer comprises 25% to 60% by weight of vinyl acetate based on the total weight of the ethylene vinyl acetate copolymer. In some embodiments, the ethylene vinyl acetate copolymer comprises 30% to 60% by weight of vinyl acetate based on the total weight of the ethylene vinyl acetate copolymer. In some embodiments, the ethylene vinyl acetate copolymer comprises 35% to 60% by weight of vinyl acetate based on the total weight of the ethylene vinyl acetate copolymer. In some embodiments, the ethylene vinyl acetate copolymer comprises 40% to 60% by weight of vinyl acetate based on the total weight of the ethylene vinyl acetate copolymer. In some embodiments, the ethylene vinyl acetate copolymer comprises 45% to 60% by weight of vinyl acetate based on the total weight of the ethylene vinyl acetate copolymer. In some embodiments, the ethylene vinyl acetate copolymer comprises 50% to 60% by weight of vinyl acetate based on the total weight of the ethylene vinyl acetate copolymer. In some embodiments, the ethylene vinyl acetate copolymer comprises 55% to 60% by weight of vinyl acetate based on the total weight of the ethylene vinyl acetate copolymer. In some embodiments, the ethylene vinyl acetate copolymer comprises 10% to 55% by weight of vinyl acetate based on the total weight of the ethylene vinyl acetate copolymer. In some embodiments, the ethylene vinyl acetate copolymer comprises 10% to 50% by weight of vinyl acetate based on the total weight of the ethylene vinyl acetate copolymer. In some embodiments, the ethylene vinyl acetate copolymer comprises 10% to 45% by weight of vinyl acetate based on the total weight of the ethylene vinyl acetate copolymer. In some embodiments, the ethylene vinyl acetate copolymer comprises 10% to 40% by weight of vinyl acetate based on the total weight of the ethylene vinyl acetate copolymer. In some embodiments, the ethylene vinyl acetate copolymer comprises 10% to 35% by weight of vinyl acetate based on the total weight of the ethylene vinyl acetate copolymer. In some embodiments, the ethylene vinyl acetate copolymer comprises 10% to 30% by weight of vinyl acetate based on the total weight of the ethylene vinyl acetate copolymer. In some embodiments, the ethylene vinyl acetate copolymer comprises 10% to 25% by weight of vinyl acetate based on the total weight of the ethylene vinyl acetate copolymer. In some embodiments, the ethylene vinyl acetate copolymer comprises 10% to 20% by weight of vinyl acetate based on the total weight of the ethylene vinyl acetate copolymer. In some embodiments, the ethylene vinyl acetate copolymer comprises 10% to 15% by weight of vinyl acetate based on the total weight of the ethylene vinyl acetate copolymer.

In some embodiments, a balance of the ethylene vinyl acetate copolymer comprises ethylene. For example, in some embodiments, the ethylene vinyl acetate copolymer comprises 40% to 90% by weight of ethylene based on the total weight of the ethylene vinyl acetate copolymer. In some embodiments, the ethylene vinyl acetate copolymer comprises 45% to 90% by weight of ethylene based on the total weight of the ethylene vinyl acetate copolymer. In some embodiments, the ethylene vinyl acetate copolymer comprises 50% to 90% by weight of ethylene based on the total weight of the ethylene vinyl acetate copolymer. In some embodiments, the ethylene vinyl acetate copolymer comprises 55% to 90% by weight of ethylene based on the total weight of the ethylene vinyl acetate copolymer. In some embodiments, the ethylene vinyl acetate copolymer comprises 60% to 90% by weight of ethylene based on the total weight of the ethylene vinyl acetate copolymer. In some embodiments, the ethylene vinyl acetate copolymer comprises 65% to 90% by weight of ethylene based on the total weight of the ethylene vinyl acetate copolymer. In some embodiments, the ethylene vinyl acetate copolymer comprises 70% to 90% by weight of ethylene based on the total weight of the ethylene vinyl acetate copolymer. In some embodiments, the ethylene vinyl acetate copolymer comprises 75% to 90% by weight of ethylene based on the total weight of the ethylene vinyl acetate copolymer. In some embodiments, the ethylene vinyl acetate copolymer comprises 80% to 90% by weight of ethylene based on the total weight of the ethylene vinyl acetate copolymer. In some embodiments, the ethylene vinyl acetate copolymer comprises 85% to 90% by weight of ethylene based on the total weight of the ethylene vinyl acetate copolymer.

In some embodiments, the ethylene vinyl acetate copolymer comprises 40% to 85% by weight of ethylene based on the total weight of the ethylene vinyl acetate copolymer. In some embodiments, the ethylene vinyl acetate copolymer comprises 40% to 80% by weight of ethylene based on the total weight of the ethylene vinyl acetate copolymer. In some embodiments, the ethylene vinyl acetate copolymer comprises 40% to 75% by weight of ethylene based on the total weight of the ethylene vinyl acetate copolymer. In some embodiments, the ethylene vinyl acetate copolymer comprises 40% to 70% by weight of ethylene based on the total weight of the ethylene vinyl acetate copolymer. In some embodiments, the ethylene vinyl acetate copolymer comprises 40% to 65% by weight of ethylene based on the total weight of the ethylene vinyl acetate copolymer. In some embodiments, the ethylene vinyl acetate copolymer comprises 40% to 60% by weight of ethylene based on the total weight of the ethylene vinyl acetate copolymer. In some embodiments, the ethylene vinyl acetate copolymer comprises 40% to 55% by weight of ethylene based on the total weight of the ethylene vinyl acetate copolymer. In some embodiments, the ethylene vinyl acetate copolymer comprises 40% to 50% by weight of ethylene based on the total weight of the ethylene vinyl acetate copolymer. In some embodiments, the ethylene vinyl acetate copolymer comprises 40% to 45% by weight of ethylene based on the total weight of the ethylene vinyl acetate copolymer.

In some embodiments, an olefin vinyl acetate copolymer other than the ethylene vinyl acetate copolymer is used. Non-limiting examples of other olefin vinyl acetate copolymers include, for example and without limitation, at least one of a propylene vinyl acetate copolymer, a butylene vinyl acetate copolymer, or any combination thereof. In some embodiments, the butylene vinyl acetate copolymer comprises an iso-butylene vinyl acetate copolymer, a butene acetate copolymer, or any combination thereof. It will be appreciated that in some embodiments olefins having more than four carbon atoms, such as, for example, olefins having five carbon atoms to ten carbon atoms, may be used herein, without departing from the scope of this disclosure.

In some embodiments, the polyolefin has a number average molecular weight of at least 25 kDa. In some embodiments, the polyolefin has a number average molecular weight of at least 100 kDa. In some embodiments, the polyolefin has a number average molecular weight of at least 150 kDa. In some embodiments, the polyolefin has a number average molecular weight of at least 200 kDa. In some embodiments, the polyolefin has a number average molecular weight of at least 250 kDa. In some embodiments, the polyolefin has a number average molecular weight of at least 300 kDa. In some embodiments, the polyolefin has a number average molecular weight of at least 350 kDa. In some embodiments, the polyolefin has a number average molecular weight of at least 400 kDa. In some embodiments, the polyolefin has a number average molecular weight of at least 450 kDa. In some embodiments, the polyolefin has a number average molecular weight of at least 500 kDa. In some embodiments, the polyolefin has a number average molecular weight of at least 550 kDa. In some embodiments, the polyolefin has a number average molecular weight of at least 600 kDa. In some embodiments, the polyolefin has a number average molecular weight of at least 650 kDa. In some embodiments, the polyolefin has a number average molecular weight of at least 700 kDa. In some embodiments, the polyolefin has a number average molecular weight of at least 750 kDa. In some embodiments, the polyolefin has a number average molecular weight of at least 800 kDa. In some embodiments, the polyolefin has a number average molecular weight of at least 850 kDa. In some embodiments, the polyolefin has a number average molecular weight of at least 900 kDa. In some embodiments, the polyolefin has a number average molecular weight of at least 950 kDa.

In some embodiments, the polyolefin has a number average molecular weight of 25 kDa to 1000 kDa. In some embodiments, the polyolefin has a number average molecular weight of 50 kDa to 1000 kDa. In some embodiments, the polyolefin has a number average molecular weight of 100 kDa to 1000 kDa. In some embodiments, the polyolefin has a number average molecular weight of 150 kDa to 1000 kDa. In some embodiments, the polyolefin has a number average molecular weight of 200 kDa to 1000 kDa. In some embodiments, the polyolefin has a number average molecular weight of 250 kDa to 1000 kDa. In some embodiments, the polyolefin has a number average molecular weight of 300 kDa to 1000 kDa. In some embodiments, the polyolefin has a number average molecular weight of 350 kDa to 1000 kDa. In some embodiments, the polyolefin has a number average molecular weight of 400 kDa to 1000 kDa. In some embodiments, the polyolefin has a number average molecular weight of 450 kDa to 1000 kDa. In some embodiments, the polyolefin has a number average molecular weight of 500 kDa to 1000 kDa. In some embodiments, the polyolefin has a number average molecular weight of 550 kDa to 1000 kDa. In some embodiments, the polyolefin has a number average molecular weight of 600 kDa to 1000 kDa. In some embodiments, the polyolefin has a number average molecular weight of 650 kDa to 1000 kDa. In some embodiments, the polyolefin has a number average molecular weight of 700 kDa to 1000 kDa. In some embodiments, the polyolefin has a number average molecular weight of 750 kDa to 1000 kDa. In some embodiments, the polyolefin has a number average molecular weight of 800 kDa to 1000 kDa. In some embodiments, the polyolefin has a number average molecular weight of 850 kDa to 1000 kDa. In some embodiments, the polyolefin has a number average molecular weight of 900 kDa to 1000 kDa. In some embodiments, the polyolefin has a number average molecular weight of 950 kDa to 1000 kDa.

In some embodiments, the polyolefin has a number average molecular weight of 25 kDa to 950 kDa. In some embodiments, the polyolefin has a number average molecular weight of 25 kDa to 900 kDa. In some embodiments, the polyolefin has a number average molecular weight of 25 kDa to 850 kDa. In some embodiments, the polyolefin has a number average molecular weight of 25 kDa to 800 kDa. In some embodiments, the polyolefin has a number average molecular weight of 25 kDa to 750 kDa. In some embodiments, the polyolefin has a number average molecular weight of 25 kDa to 700 kDa. In some embodiments, the polyolefin has a number average molecular weight of 25 kDa to 650 kDa. In some embodiments, the polyolefin has a number average molecular weight of 25 kDa to 600 kDa. In some embodiments, the polyolefin has a number average molecular weight of 25 kDa to 550 kDa. In some embodiments, the polyolefin has a number average molecular weight of 25 kDa to 500 kDa. In some embodiments, the polyolefin has a number average molecular weight of 25 kDa to 450 kDa. In some embodiments, the polyolefin has a number average molecular weight of 25 kDa to 400 kDa. In some embodiments, the polyolefin has a number average molecular weight of 25 kDa to 350 kDa. In some embodiments, the polyolefin has a number average molecular weight of 25 kDa to 300 kDa. In some embodiments, the polyolefin has a number average molecular weight of 25 kDa to 250 kDa. In some embodiments, the polyolefin has a number average molecular weight of 25 kDa to 200 kDa. In some embodiments, the polyolefin has a number average molecular weight of 25 kDa to 150 kDa.

In some embodiments, the polyolefin has a number average molecular weight of at least 25 kDa. In some embodiments, the polyolefin has a number average molecular weight of at least 30 kDa. In some embodiments, the polyolefin has a number average molecular weight of at least 35 kDa. In some embodiments, the polyolefin has a number average molecular weight of at least 40 kDa. In some embodiments, the polyolefin has a number average molecular weight of at least 45 kDa. In some embodiments, the polyolefin has a number average molecular weight of at least 50 kDa. In some embodiments, the polyolefin has a number average molecular weight of at least 55 kDa. In some embodiments, the polyolefin has a number average molecular weight of at least 60 kDa. In some embodiments, the polyolefin has a number average molecular weight of at least 65 kDa. In some embodiments, the polyolefin has a number average molecular weight of at least 70 kDa. In some embodiments, the polyolefin has a number average molecular weight of at least 75 kDa. In some embodiments, the polyolefin has a number average molecular weight of at least 80 kDa. In some embodiments, the polyolefin has a number average molecular weight of at least 85 kDa. In some embodiments, the polyolefin has a number average molecular weight of at least 90 kDa. In some embodiments, the polyolefin has a number average molecular weight of at least 95 kDa.

In some embodiments, the polyolefin has a number average molecular weight of 25 kDa to 100 kDa. In some embodiments, the polyolefin has a number average molecular weight of 30 kDa to 100 kDa. In some embodiments, the polyolefin has a number average molecular weight of 35 kDa to 100 kDa. In some embodiments, the polyolefin has a number average molecular weight of 40 kDa to 100 kDa. In some embodiments, the polyolefin has a number average molecular weight of 45 kDa to 100 kDa. In some embodiments, the polyolefin has a number average molecular weight of 50 kDa to 100 kDa. In some embodiments, the polyolefin has a number average molecular weight of 55 kDa to 100 kDa. In some embodiments, the polyolefin has a number average molecular weight of 60 kDa to 100 kDa. In some embodiments, the polyolefin has a number average molecular weight of 65 kDa to 100 kDa. In some embodiments, the polyolefin has a number average molecular weight of 70 kDa to 100 kDa. In some embodiments, the polyolefin has a number average molecular weight of 75 kDa to 100 kDa. In some embodiments, the polyolefin has a number average molecular weight of 80 kDa to 100 kDa. In some embodiments, the polyolefin has a number average molecular weight of 85 kDa to 100 kDa. In some embodiments, the polyolefin has a number average molecular weight of 90 kDa to 100 kDa. In some embodiments, the polyolefin has a number average molecular weight of 95 kDa to 100 kDa.

In some embodiments, the polyolefin has a number average molecular weight of 25 kDa to 95 kDa. In some embodiments, the polyolefin has a number average molecular weight of 25 kDa to 90 kDa. In some embodiments, the polyolefin has a number average molecular weight of 25 kDa to 85 kDa. In some embodiments, the polyolefin has a number average molecular weight of 25 kDa to 80 kDa. In some embodiments, the polyolefin has a number average molecular weight of 25 kDa to 75 kDa. In some embodiments, the polyolefin has a number average molecular weight of 25 kDa to 70 kDa. In some embodiments, the polyolefin has a number average molecular weight of 25 kDa to 65 kDa. In some embodiments, the polyolefin has a number average molecular weight of 25 kDa to 60 kDa. In some embodiments, the polyolefin has a number average molecular weight of 25 kDa to 55 kDa. In some embodiments, the polyolefin has a number average molecular weight of 25 kDa to 50 kDa. In some embodiments, the polyolefin has a number average molecular weight of 25 kDa to 45 kDa. In some embodiments, the polyolefin has a number average molecular weight of 25 kDa to 40 kDa. In some embodiments, the polyolefin has a number average molecular weight of 25 kDa to 35 kDa. In some embodiments, the polyolefin has a number average molecular weight of 25 kDa to 30 kDa.

In some embodiments, the polyolefin has a polydispersity index of 10 or less. In some embodiments, the polyolefin has a polydispersity index of 9 or less. In some embodiments, the polyolefin has a polydispersity index of 8 or less. In some embodiments, the polyolefin has a polydispersity index of 7 or less. In some embodiments, the polyolefin has a polydispersity index of 6 or less. In some embodiments, the polyolefin has a polydispersity index of 5 or less. In some embodiments, the polyolefin has a polydispersity index of 4 or less. In some embodiments, the polyolefin has a polydispersity index of 3 or less. In some embodiments, the polyolefin has a polydispersity index of 2 or less. In some embodiments, the polyolefin has a polydispersity index of 1 or less.

In some embodiments, the polyolefin has a polydispersity index of 1 to 10. In some embodiments, the polyolefin has a polydispersity index of 2 to 10. In some embodiments, the polyolefin has a polydispersity index of 3 to 10. In some embodiments, the polyolefin has a polydispersity index of 4 to 10. In some embodiments, the polyolefin has a polydispersity index of 5 to 10. In some embodiments, the polyolefin has a polydispersity index of 6 to 10. In some embodiments, the polyolefin has a polydispersity index of 7 to 10. In some embodiments, the polyolefin has a polydispersity index of 8 to 10. In some embodiments, the polyolefin has a polydispersity index of 9 to 10. In some embodiments, the polyolefin has a polydispersity index of 1 to 9. In some embodiments, the polyolefin has a polydispersity index of 1 to 8. In some embodiments, the polyolefin has a polydispersity index of 1 to 7. In some embodiments, the polyolefin has a polydispersity index of 1 to 6. In some embodiments, the polyolefin has a polydispersity index of 1 to 5. In some embodiments, the polyolefin has a polydispersity index of 1 to 4. In some embodiments, the polyolefin has a polydispersity index of 1 to 3. In some embodiments, the polyolefin has a polydispersity index of 1 to 2.

In some embodiments, the polyolefin has a polydispersity index of greater than 1 to 10. In some embodiments, the polyolefin has a polydispersity index of 2 to 10. In some embodiments, the polyolefin has a polydispersity index of 3 to 10. In some embodiments, the polyolefin has a polydispersity index of 4 to 10. In some embodiments, the polyolefin has a polydispersity index of 5 to 10. In some embodiments, the polyolefin has a polydispersity index of 6 to 10. In some embodiments, the polyolefin has a polydispersity index of 7 to 10. In some embodiments, the polyolefin has a polydispersity index of 8 to 10. In some embodiments, the polyolefin has a polydispersity index of 9 to 10. In some embodiments, the polyolefin has a polydispersity index of greater than 1 to 9. In some embodiments, the polyolefin has a polydispersity index of greater than 1 to 8. In some embodiments, the polyolefin has a polydispersity index of greater than 1 to 7. In some embodiments, the polyolefin has a polydispersity index of greater than 1 to 6. In some embodiments, the polyolefin has a polydispersity index of greater than 1 to 5. In some embodiments, the polyolefin has a polydispersity index of greater than 1 to 4. In some embodiments, the polyolefin has a polydispersity index of greater than 1 to 3. In some embodiments, the polyolefin has a polydispersity index of greater than 1 to 2.

In some embodiments, the ethylene vinyl acetate copolymer has a melt flow index of greater than 6 g/10 min as measured according to ISO 1133. In some embodiments, the ethylene vinyl acetate copolymer has a melt flow index of greater than 7 g/10 min as measured according to ISO 1133. In some embodiments, the ethylene vinyl acetate copolymer has a melt flow index of greater than 8 g/10 min as measured according to ISO 1133. In some embodiments, the ethylene vinyl acetate copolymer has a melt flow index of greater than 9 g/10 min as measured according to ISO 1133. In some embodiments, the ethylene vinyl acetate copolymer has a melt flow index of greater than 10 g/10 min as measured according to ISO 1133. In some embodiments, the ethylene vinyl acetate copolymer has a melt flow index of greater than 20 g/10 min as measured according to ISO 1133. In some embodiments, the ethylene vinyl acetate copolymer has a melt flow index of greater than 30 g/10 min as measured according to ISO 1133. In some embodiments, the ethylene vinyl acetate copolymer has a melt flow index of greater than 40 g/10 min as measured according to ISO 1133. In some embodiments, the ethylene vinyl acetate copolymer has a melt flow index of greater than 50 g/10 min as measured according to ISO 1133. In some embodiments, the ethylene vinyl acetate copolymer has a melt flow index of greater than 60 g/10 min as measured according to ISO 1133. In some embodiments, the ethylene vinyl acetate copolymer has a melt flow index of greater than 70 g/10 min as measured according to ISO 1133. In some embodiments, the ethylene vinyl acetate copolymer has a melt flow index of greater than 80 g/10 min as measured according to ISO 1133. In some embodiments, the ethylene vinyl acetate copolymer has a melt flow index of greater than 90 g/10 min as measured according to ISO 1133. In some embodiments, the ethylene vinyl acetate copolymer has a melt flow index of greater than 100 g/10 min as measured according to ISO 1133. In some embodiments, the ethylene vinyl acetate copolymer has a melt flow index of greater than 110 g/10 min as measured according to ISO 1133. In some embodiments, the ethylene vinyl acetate copolymer has a melt flow index of greater than 120 g/10 min as measured according to ISO 1133. In some embodiments, the ethylene vinyl acetate copolymer has a melt flow index of greater than 130 g/10 min as measured according to ISO 1133. In some embodiments, the ethylene vinyl acetate copolymer has a melt flow index of greater than 140 g/10 min as measured according to ISO 1133.

In some embodiments, the ethylene vinyl acetate copolymer has a melt flow index of 6 g/10 min to 150 g/10 min as measured according to ISO 1133. In some embodiments, the ethylene vinyl acetate copolymer has a melt flow index of 7 g/10 min to 150 g/10 min as measured according to ISO 1133. In some embodiments, the ethylene vinyl acetate copolymer has a melt flow index of 8 g/10 min to 150 g/10 min as measured according to ISO 1133. In some embodiments, the ethylene vinyl acetate copolymer has a melt flow index of 9 g/10 min to 150 g/10 min as measured according to ISO 1133. In some embodiments, the ethylene vinyl acetate copolymer has a melt flow index of 10 g/10 min to 150 g/10 min as measured according to ISO 1133. In some embodiments, the ethylene vinyl acetate copolymer has a melt flow index of 20 g/10 min to 150 g/10 min as measured according to ISO 1133. In some embodiments, the ethylene vinyl acetate copolymer has a melt flow index of 30 g/10 min to 150 g/10 min as measured according to ISO 1133. In some embodiments, the ethylene vinyl acetate copolymer has a melt flow index of 40 g/10 min to 150 g/10 min as measured according to ISO 1133. In some embodiments, the ethylene vinyl acetate copolymer has a melt flow index of 50 g/10 min to 150 g/10 min as measured according to ISO 1133. In some embodiments, the ethylene vinyl acetate copolymer has a melt flow index of 60 g/10 min to 150 g/10 min as measured according to ISO 1133. In some embodiments, the ethylene vinyl acetate copolymer has a melt flow index of 70 g/10 min to 150 g/10 min as measured according to ISO 1133. In some embodiments, the ethylene vinyl acetate copolymer has a melt flow index of 80 g/10 min to 150 g/10 min as measured according to ISO 1133. In some embodiments, the ethylene vinyl acetate copolymer has a melt flow index of 90 g/10 min to 150 g/10 min as measured according to ISO 1133. In some embodiments, the ethylene vinyl acetate copolymer has a melt flow index of 100 g/10 min to 150 g/10 min as measured according to ISO 1133. In some embodiments, the ethylene vinyl acetate copolymer has a melt flow index of 110 g/10 min to 150 g/10 min as measured according to ISO 1133. In some embodiments, the ethylene vinyl acetate copolymer has a melt flow index of 120 g/10 min to 150 g/10 min as measured according to ISO 1133. In some embodiments, the ethylene vinyl acetate copolymer has a melt flow index of 130 g/10 min to 150 g/10 min as measured according to ISO 1133. In some embodiments, the ethylene vinyl acetate copolymer has a melt flow index of 140 g/10 min to 150 g/10 min as measured according to ISO 1133.

In some embodiments, the ethylene vinyl acetate copolymer has a melt flow index of 6 g/10 min to 140 g/10 min as measured according to ISO 1133. In some embodiments, the ethylene vinyl acetate copolymer has a melt flow index of 6 g/10 min to 130 g/10 min as measured according to ISO 1133. In some embodiments, the ethylene vinyl acetate copolymer has a melt flow index of 6 g/10 min to 120 g/10 min as measured according to ISO 1133. In some embodiments, the ethylene vinyl acetate copolymer has a melt flow index of 6 g/10 min to 110 g/10 min as measured according to ISO 1133. In some embodiments, the ethylene vinyl acetate copolymer has a melt flow index of 6 g/10 min to 100 g/10 min as measured according to ISO 1133. In some embodiments, the ethylene vinyl acetate copolymer has a melt flow index of 6 g/10 min to 90 g/10 min as measured according to ISO 1133. In some embodiments, the ethylene vinyl acetate copolymer has a melt flow index of 6 g/10 min to 80 g/10 min as measured according to ISO 1133. In some embodiments, the ethylene vinyl acetate copolymer has a melt flow index of 6 g/10 min to 70 g/10 min as measured according to ISO 1133. In some embodiments, the ethylene vinyl acetate copolymer has a melt flow index of 6 g/10 min to 60 g/10 min as measured according to ISO 1133. In some embodiments, the ethylene vinyl acetate copolymer has a melt flow index of 6 g/10 min to 50 g/10 min as measured according to ISO 1133. In some embodiments, the ethylene vinyl acetate copolymer has a melt flow index of 6 g/10 min to 40 g/10 min as measured according to ISO 1133. In some embodiments, the ethylene vinyl acetate copolymer has a melt flow index of 6 g/10 min to 30 g/10 min as measured according to ISO 1133. In some embodiments, the ethylene vinyl acetate copolymer has a melt flow index of 6 g/10 min to 20 g/10 min as measured according to ISO 1133. In some embodiments, the ethylene vinyl acetate copolymer has a melt flow index of 6 g/10 min to 10 g/10 min as measured according to ISO 1133.

In some embodiments, the melt flow index is measured at 230° C./2.16 kg according to ISO 1133. In some embodiments, the melt flow index is measured at 190° C./2.16 kg according to ISO 1133.

In some embodiments, the ethylene vinyl acetate copolymer comprises 10% to 60% by weight of vinyl acetate based on a total weight of the ethylene vinyl acetate copolymer. In some embodiments, the ethylene vinyl acetate copolymer comprises 15% to 60% by weight of vinyl acetate based on the total weight of the ethylene vinyl acetate copolymer. In some embodiments, the ethylene vinyl acetate copolymer comprises 20% to 60% by weight of vinyl acetate based on the total weight of the ethylene vinyl acetate copolymer. In some embodiments, the ethylene vinyl acetate copolymer comprises 25% to 60% by weight of vinyl acetate based on the total weight of the ethylene vinyl acetate copolymer. In some embodiments, the ethylene vinyl acetate copolymer comprises 30% to 60% by weight of vinyl acetate based on the total weight of the ethylene vinyl acetate copolymer. In some embodiments, the ethylene vinyl acetate copolymer comprises 35% to 60% by weight of vinyl acetate based on the total weight of the ethylene vinyl acetate copolymer. In some embodiments, the ethylene vinyl acetate copolymer comprises 40% to 60% by weight of vinyl acetate based on the total weight of the ethylene vinyl acetate copolymer. In some embodiments, the ethylene vinyl acetate copolymer comprises 45% to 60% by weight of vinyl acetate based on the total weight of the ethylene vinyl acetate copolymer. In some embodiments, the ethylene vinyl acetate copolymer comprises 50% to 60% by weight of vinyl acetate based on the total weight of the ethylene vinyl acetate copolymer. In some embodiments, the ethylene vinyl acetate copolymer comprises 55% to 60% by weight of vinyl acetate based on the total weight of the ethylene vinyl acetate copolymer.

In some embodiments, the ethylene vinyl acetate copolymer comprises 10% to 55% by weight of vinyl acetate based on the total weight of the ethylene vinyl acetate copolymer. In some embodiments, the ethylene vinyl acetate copolymer comprises 10% to 50% by weight of vinyl acetate based on the total weight of the ethylene vinyl acetate copolymer. In some embodiments, the ethylene vinyl acetate copolymer comprises 10% to 45% by weight of vinyl acetate based on the total weight of the ethylene vinyl acetate copolymer. In some embodiments, the ethylene vinyl acetate copolymer comprises 10% to 40% by weight of vinyl acetate based on the total weight of the ethylene vinyl acetate copolymer. In some embodiments, the ethylene vinyl acetate copolymer comprises 10% to 35% by weight of vinyl acetate based on the total weight of the ethylene vinyl acetate copolymer. In some embodiments, the ethylene vinyl acetate copolymer comprises 10% to 30% by weight of vinyl acetate based on the total weight of the ethylene vinyl acetate copolymer. In some embodiments, the ethylene vinyl acetate copolymer comprises 10% to 25% by weight of vinyl acetate based on the total weight of the ethylene vinyl acetate copolymer. In some embodiments, the ethylene vinyl acetate copolymer comprises 10% to 20% by weight of vinyl acetate based on the total weight of the ethylene vinyl acetate copolymer. In some embodiments, the ethylene vinyl acetate copolymer comprises 10% to 15% by weight of vinyl acetate based on the total weight of the ethylene vinyl acetate copolymer.

In some embodiments, the polymer-modified asphalt composition does not comprise a styrene-containing polymer.

In some embodiments, the polymer-modified asphalt composition has a softening point of 190° F. to 320° F., as measured according to ASTM D3462. In some embodiments, the polymer-modified asphalt composition has a softening point of 195° F. to 320° F., as measured according to ASTM D3462. In some embodiments, the polymer-modified asphalt composition has a softening point of 200° F. to 320° F., as measured according to ASTM D3462. In some embodiments, the polymer-modified asphalt composition has a softening point of 205° F. to 320° F., as measured according to ASTM D3462. In some embodiments, the polymer-modified asphalt composition has a softening point of 210° F. to 320° F., as measured according to ASTM D3462. In some embodiments, the polymer-modified asphalt composition has a softening point of 215° F. to 320° F., as measured according to ASTM D3462. In some embodiments, the polymer-modified asphalt composition has a softening point of 220° F. to 320° F., as measured according to ASTM D3462. In some embodiments, the polymer-modified asphalt composition has a softening point of 225° F. to 320° F., as measured according to ASTM D3462. In some embodiments, the polymer-modified asphalt composition has a softening point of 230° F. to 320° F., as measured according to ASTM D3462. In some embodiments, the polymer-modified asphalt composition has a softening point of 235° F. to 320° F., as measured according to ASTM D3462. In some embodiments, the polymer-modified asphalt composition has a softening point of 240° F. to 320° F., as measured according to ASTM D3462. In some embodiments, the polymer-modified asphalt composition has a softening point of 245° F. to 320° F., as measured according to ASTM D3462. In some embodiments, the polymer-modified asphalt composition has a softening point of 250° F. to 320° F., as measured according to ASTM D3462. In some embodiments, the polymer-modified asphalt composition has a softening point of 255° F. to 320° F., as measured according to ASTM D3462. In some embodiments, the polymer-modified asphalt composition has a softening point of 260° F. to 320° F., as measured according to ASTM D3462. In some embodiments, the polymer-modified asphalt composition has a softening point of 265° F. to 320° F., as measured according to ASTM D3462. In some embodiments, the polymer-modified asphalt composition has a softening point of 270° F. to 320° F., as measured according to ASTM D3462. In some embodiments, the polymer-modified asphalt composition has a softening point of 275° F. to 320° F., as measured according to ASTM D3462. In some embodiments, the polymer-modified asphalt composition has a softening point of 280° F. to 320° F., as measured according to ASTM D3462. In some embodiments, the polymer-modified asphalt composition has a softening point of 285° F. to 320° F., as measured according to ASTM D3462. In some embodiments, the polymer-modified asphalt composition has a softening point of 290° F. to 320° F., as measured according to ASTM D3462. In some embodiments, the polymer-modified asphalt composition has a softening point of 295° F. to 320° F., as measured according to ASTM D3462. In some embodiments, the polymer-modified asphalt composition has a softening point of 300° F. to 320° F., as measured according to ASTM D3462. In some embodiments, the polymer-modified asphalt composition has a softening point of 305° F. to 320° F., as measured according to ASTM D3462. In some embodiments, the polymer-modified asphalt composition has a softening point of 310° F. to 320° F., as measured according to ASTM D3462. In some embodiments, the polymer-modified asphalt composition has a softening point of 315° F. to 320° F., as measured according to ASTM D3462.

In some embodiments, the polymer-modified asphalt composition has a softening point of 190° F. to 315° F., as measured according to ASTM D3462. In some embodiments, the polymer-modified asphalt composition has a softening point of 190° F. to 310° F., as measured according to ASTM D3462. In some embodiments, the polymer-modified asphalt composition has a softening point of 190° F. to 305° F., as measured according to ASTM D3462. In some embodiments, the polymer-modified asphalt composition has a softening point of 190° F. to 300° F., as measured according to ASTM D3462. In some embodiments, the polymer-modified asphalt composition has a softening point of 190° F. to 295° F., as measured according to ASTM D3462. In some embodiments, the polymer-modified asphalt composition has a softening point of 190° F. to 290° F., as measured according to ASTM D3462. In some embodiments, the polymer-modified asphalt composition has a softening point of 190° F. to 285° F., as measured according to ASTM D3462. In some embodiments, the polymer-modified asphalt composition has a softening point of 190° F. to 280° F., as measured according to ASTM D3462. In some embodiments, the polymer-modified asphalt composition has a softening point of 190° F. to 275° F., as measured according to ASTM D3462. In some embodiments, the polymer-modified asphalt composition has a softening point of 190° F. to 270° F., as measured according to ASTM D3462. In some embodiments, the polymer-modified asphalt composition has a softening point of 190° F. to 265° F., as measured according to ASTM D3462. In some embodiments, the polymer-modified asphalt composition has a softening point of 190° F. to 260° F., as measured according to ASTM D3462. In some embodiments, the polymer-modified asphalt composition has a softening point of 190° F. to 255° F., as measured according to ASTM D3462. In some embodiments, the polymer-modified asphalt composition has a softening point of 190° F. to 250° F., as measured according to ASTM D3462. In some embodiments, the polymer-modified asphalt composition has a softening point of 190° F. to 245° F., as measured according to ASTM D3462. In some embodiments, the polymer-modified asphalt composition has a softening point of 190° F. to 240° F., as measured according to ASTM D3462. In some embodiments, the polymer-modified asphalt composition has a softening point of 190° F. to 235° F., as measured according to ASTM D3462. In some embodiments, the polymer-modified asphalt composition has a softening point of 190° F. to 230° F., as measured according to ASTM D3462. In some embodiments, the polymer-modified asphalt composition has a softening point of 190° F. to 225° F., as measured according to ASTM D3462. In some embodiments, the polymer-modified asphalt composition has a softening point of 190° F. to 220° F., as measured according to ASTM D3462. In some embodiments, the polymer-modified asphalt composition has a softening point of 190° F. to 215° F., as measured according to ASTM D3462. In some embodiments, the polymer-modified asphalt composition has a softening point of 190° F. to 210° F., as measured according to ASTM D3462. In some embodiments, the polymer-modified asphalt composition has a softening point of 190° F. to 205° F., as measured according to ASTM D3462. In some embodiments, the polymer-modified asphalt composition has a softening point of 190° F. to 200° F., as measured according to ASTM D3462. In some embodiments, the polymer-modified asphalt composition has a softening point of 190° F. to 195° F., as measured according to ASTM D3462.

In some embodiments, the polymer-modified asphalt composition has a penetration point of 15 dmm or greater at 77° F. In some embodiments, the polymer-modified asphalt composition has a penetration point of 16 dmm or greater at 77° F. In some embodiments, the polymer-modified asphalt composition has a penetration point of 18 dmm or greater at 77° F. In some embodiments, the polymer-modified asphalt composition has a penetration point of 20 dmm or greater at 77° F. In some embodiments, the polymer-modified asphalt composition has a penetration point of 22 dmm or greater at 77° F. In some embodiments, the polymer-modified asphalt composition has a penetration point of 24 dmm or greater at 77° F. In some embodiments, the polymer-modified asphalt composition has a penetration point of 25 dmm or greater at 77° F. In some embodiments, the polymer-modified asphalt composition has a penetration point of 26 dmm or greater at 77° F. In some embodiments, the polymer-modified asphalt composition has a penetration point of 28 dmm or greater at 77° F.

In some embodiments, the polymer-modified asphalt composition has a penetration point of 15 dmm to 30 dmm at 77° F. In some embodiments, the polymer-modified asphalt composition has a penetration point of 16 dmm to 30 dmm at 77° F. In some embodiments, the polymer-modified asphalt composition has a penetration point of 18 dmm to 30 dmm at 77° F. In some embodiments, the polymer-modified asphalt composition has a penetration point of 20 dmm to 30 dmm at 77° F. In some embodiments, the polymer-modified asphalt composition has a penetration point of 22 dmm to 30 dmm at 77° F. In some embodiments, the polymer-modified asphalt composition has a penetration point of 24 dmm to 30 dmm at 77° F. In some embodiments, the polymer-modified asphalt composition has a penetration point of 25 dmm to 30 dmm at 77° F. In some embodiments, the polymer-modified asphalt composition has a penetration point of 26 dmm to 30 dmm at 77° F. In some embodiments, the polymer-modified asphalt composition has a penetration point of 28 dmm to 30 dmm at 77° F.

In some embodiments, the polymer-modified asphalt composition has a penetration point of 15 dmm to 28 dmm at 77° F. In some embodiments, the polymer-modified asphalt composition has a penetration point of 15 dmm to 26 dmm at 77° F. In some embodiments, the polymer-modified asphalt composition has a penetration point of 15 dmm to 25 dmm at 77° F. In some embodiments, the polymer-modified asphalt composition has a penetration point of 15 dmm to 24 dmm at 77° F. In some embodiments, the polymer-modified asphalt composition has a penetration point of 15 dmm to 22 dmm at 77° F. In some embodiments, the polymer-modified asphalt composition has a penetration point of 15 dmm to 20 dmm at 77° F. In some embodiments, the polymer-modified asphalt composition has a penetration point of 15 dmm to 18 dmm at 77° F. In some embodiments, the polymer-modified asphalt composition has a penetration point of 15 dmm to 16 dmm at 77° F.

In some embodiments, the polymer-modified asphalt composition has a viscosity of 150 cP to 1000 cP as measured according to ASTM D4402 at 400° F. In some embodiments, the polymer-modified asphalt composition has a viscosity of 250 cP to 1000 cP as measured according to ASTM D4402 at 400° F. In some embodiments, the polymer-modified asphalt composition has a viscosity of 300 cP to 1000 cP as measured according to ASTM D4402 at 400° F. In some embodiments, the polymer-modified asphalt composition has a viscosity of 350 cP to 1000 cP as measured according to ASTM D4402 at 400° F. In some embodiments, the polymer-modified asphalt composition has a viscosity of 400 cP to 1000 cP as measured according to ASTM D4402 at 400° F. In some embodiments, the polymer-modified asphalt composition has a viscosity of 450 cP to 1000 cP as measured according to ASTM D4402 at 400° F. In some embodiments, the polymer-modified asphalt composition has a viscosity of 500 cP to 1000 cP as measured according to ASTM D4402 at 400° F. In some embodiments, the polymer-modified asphalt composition has a viscosity of 550 cP to 1000 cP as measured according to ASTM D4402 at 400° F. In some embodiments, the polymer-modified asphalt composition has a viscosity of 600 cP to 1000 cP as measured according to ASTM D4402 at 400° F. In some embodiments, the polymer-modified asphalt composition has a viscosity of 650 cP to 1000 cP as measured according to ASTM D4402 at 400° F. In some embodiments, the polymer-modified asphalt composition has a viscosity of 700 cP to 1000 cP as measured according to ASTM D4402 at 400° F. In some embodiments, the polymer-modified asphalt composition has a viscosity of 750 cP to 1000 cP as measured according to ASTM D4402 at 400° F. In some embodiments, the polymer-modified asphalt composition has a viscosity of 800 cP to 1000 cP as measured according to ASTM D4402 at 400° F. In some embodiments, the polymer-modified asphalt composition has a viscosity of 850 cP to 1000 cP as measured according to ASTM D4402 at 400° F. In some embodiments, the polymer-modified asphalt composition has a viscosity of 900 cP to 1000 cP as measured according to ASTM D4402 at 400° F. In some embodiments, the polymer-modified asphalt composition has a viscosity of 950 cP to 1000 cP as measured according to ASTM D4402 at 400° F.

In some embodiments, the polymer-modified asphalt composition has a viscosity of 150 cP to 950 cP as measured according to as measured according to ASTM D4402 at 400° F. In some embodiments, the polymer-modified asphalt composition has a viscosity of 150 cP to 900 cP as measured according to ASTM D4402 at 400° F. In some embodiments, the polymer-modified asphalt composition has a viscosity of 150 cP to 850 cP as measured according to ASTM D4402 at 400° F. In some embodiments, the polymer-modified asphalt composition has a viscosity of 150 cP to 800 cP as measured according to ASTM D4402 at 400° F. In some embodiments, the polymer-modified asphalt composition has a viscosity of 150 cP to 750 cP as measured according to ASTM D4402 at 400° F. In some embodiments, the polymer-modified asphalt composition has a viscosity of 150 cP to 700 cP as measured according to ASTM D4402 at 400° F. In some embodiments, the polymer-modified asphalt composition has a viscosity of 150 cP to 650 cP as measured according to ASTM D4402 at 400° F. In some embodiments, the polymer-modified asphalt composition has a viscosity of 150 cP to 600 cP as measured according to ASTM D4402 at 400° F. In some embodiments, the polymer-modified asphalt composition has a viscosity of 150 cP to 550 cP as measured according to ASTM D4402 at 400° F. In some embodiments, the polymer-modified asphalt composition has a viscosity of 150 cP to 500 cP as measured according to ASTM D4402 at 400° F. In some embodiments, the polymer-modified asphalt composition has a viscosity of 150 cP to 450 cP as measured according to ASTM D4402 at 400° F. In some embodiments, the polymer-modified asphalt composition has a viscosity of 150 cP to 400 cP as measured according to ASTM D4402 at 400° F. In some embodiments, the polymer-modified asphalt composition has a viscosity of 150 cP to 350 cP as measured according to ASTM D4402 at 400° F. In some embodiments, the polymer-modified asphalt composition has a viscosity of 150 cP to 300 cP as measured according to ASTM D4402 at 400° F. In some embodiments, the polymer-modified asphalt composition has a viscosity of 150 cP to 250 cP as measured according to ASTM D4402 at 400° F.

In some embodiments, the polymer-modified asphalt composition has a viscosity of 200 cP to 700 cP as measured according to ASTM D4402 at 400° F. In some embodiments, the polymer-modified asphalt composition has a viscosity of 220 cP to 700 cP as measured according to ASTM D4402 at 400° F. In some embodiments, the polymer-modified asphalt composition has a viscosity of 240 cP to 700 cP as measured according to ASTM D4402 at 400° F. In some embodiments, the polymer-modified asphalt composition has a viscosity of 260 cP to 700 cP as measured according to ASTM D4402 at 400° F. In some embodiments, the polymer-modified asphalt composition has a viscosity of 280 cP to 700 cP as measured according to ASTM D4402 at 400° F. In some embodiments, the polymer-modified asphalt composition has a viscosity of 300 cP to 700 cP as measured according to ASTM D4402 at 400° F.

In some embodiments, the polymer-modified asphalt composition has a viscosity of 320 cP to 700 cP as measured according to ASTM D4402 at 400° F. In some embodiments, the polymer-modified asphalt composition has a viscosity of 340 cP to 700 cP as measured according to ASTM D4402 at 400° F. In some embodiments, the polymer-modified asphalt composition has a viscosity of 360 cP to 700 cP as measured according to ASTM D4402 at 400° F. In some embodiments, the polymer-modified asphalt composition has a viscosity of 380 cP to 700 cP as measured according to ASTM D4402 at 400° F. In some embodiments, the polymer-modified asphalt composition has a viscosity of 400 cP to 700 cP as measured according to ASTM D4402 at 400° F.

In some embodiments, the polymer-modified asphalt composition has a viscosity of 420 cP to 700 cP as measured according to ASTM D4402 at 400° F. In some embodiments, the polymer-modified asphalt composition has a viscosity of 440 cP to 700 cP as measured according to ASTM D4402 at 400° F. In some embodiments, the polymer-modified asphalt composition has a viscosity of 460 cP to 700 cP as measured according to ASTM D4402 at 400° F. In some embodiments, the polymer-modified asphalt composition has a viscosity of 480 cP to 700 cP as measured according to ASTM D4402 at 400° F. In some embodiments, the polymer-modified asphalt composition has a viscosity of 500 cP to 700 cP as measured according to ASTM D4402 at 400° F.

In some embodiments, the polymer-modified asphalt composition has a viscosity of 620 cP to 700 cP as measured according to ASTM D4402 at 400° F. In some embodiments, the polymer-modified asphalt composition has a viscosity of 640 cP to 700 cP as measured according to ASTM D4402 at 400° F. In some embodiments, the polymer-modified asphalt composition has a viscosity of 660 cP to 700 cP as measured according to ASTM D4402 at 400° F. In some embodiments, the polymer-modified asphalt composition has a viscosity of 680 cP to 700 cP as measured according to ASTM D4402 at 400° F.

In some embodiments, the polymer-modified asphalt composition has a viscosity of 200 cP to 800 cP as measured according to ASTM D4402 at 400° F. In some embodiments, the polymer-modified asphalt composition has a viscosity of 200 cP to 780 cP as measured according to ASTM D4402 at 400° F. In some embodiments, the polymer-modified asphalt composition has a viscosity of 200 cP to 760 cP as measured according to ASTM D4402 at 400° F. In some embodiments, the polymer-modified asphalt composition has a viscosity of 200 cP to 740 cP as measured according to ASTM D4402 at 400° F. In some embodiments, the polymer-modified asphalt composition has a viscosity of 200 cP to 720 cP as measured according to ASTM D4402 at 400° F.

In some embodiments, the polymer-modified asphalt composition has a viscosity of 200 cP to 700 cP as measured according to ASTM D4402 at 400° F. In some embodiments, the polymer-modified asphalt composition has a viscosity of 200 cP to 680 cP as measured according to ASTM D4402 at 400° F. In some embodiments, the polymer-modified asphalt composition has a viscosity of 200 cP to 660 cP as measured according to ASTM D4402 at 400° F. In some embodiments, the polymer-modified asphalt composition has a viscosity of 200 cP to 640 cP as measured according to ASTM D4402 at 400° F. In some embodiments, the polymer-modified asphalt composition has a viscosity of 200 cP to 620 cP as measured according to ASTM D4402 at 400° F.

In some embodiments, the polymer-modified asphalt composition has a viscosity of 200 cP to 600 cP as measured according to ASTM D4402 at 400° F. In some embodiments, the polymer-modified asphalt composition has a viscosity of 200 cP to 580 cP as measured according to ASTM D4402 at 400° F. In some embodiments, the polymer-modified asphalt composition has a viscosity of 200 cP to 560 cP as measured according to ASTM D4402 at 400° F. In some embodiments, the polymer-modified asphalt composition has a viscosity of 200 cP to 540 cP as measured according to ASTM D4402 at 400° F. In some embodiments, the polymer-modified asphalt composition has a viscosity of 200 cP to 520 cP as measured according to ASTM D4402 at 400° F.

In some embodiments, the polymer-modified asphalt composition has a viscosity of 200 cP to 500 cP as measured according to ASTM D4402 at 400° F. In some embodiments, the polymer-modified asphalt composition has a viscosity of 200 cP to 480 cP as measured according to ASTM D4402 at 400° F. In some embodiments, the polymer-modified asphalt composition has a viscosity of 200 cP to 460 cP as measured according to ASTM D4402 at 400° F. In some embodiments, the polymer-modified asphalt composition has a viscosity of 200 cP to 440 cP as measured according to ASTM D4402 at 400° F. In some embodiments, the polymer-modified asphalt composition has a viscosity of 200 cP to 420 cP as measured according to ASTM D4402 at 400° F.

In some embodiments, the polymer-modified asphalt composition has a viscosity of 200 cP to 400 cP as measured according to ASTM D4402 at 400° F. In some embodiments, the polymer-modified asphalt composition has a viscosity of 200 cP to 380 cP as measured according to ASTM D4402 at 400° F. In some embodiments, the polymer-modified asphalt composition has a viscosity of 200 cP to 360 cP as measured according to ASTM D4402 at 400° F. In some embodiments, the polymer-modified asphalt composition has a viscosity of 200 cP to 340 cP as measured according to ASTM D4402 at 400° F. In some embodiments, the polymer-modified asphalt composition has a viscosity of 200 cP to 320 cP as measured according to ASTM D4402 at 400° F.

In some embodiments, the polymer-modified asphalt composition has a viscosity of 200 cP to 300 cP as measured according to ASTM D4402 at 400° F. In some embodiments, the polymer-modified asphalt composition has a viscosity of 200 cP to 280 cP as measured according to ASTM D4402 at 400° F. In some embodiments, the polymer-modified asphalt composition has a viscosity of 200 cP to 260 cP as measured according to ASTM D4402 at 400° F. In some embodiments, the polymer-modified asphalt composition has a viscosity of 200 cP to 240 cP as measured according to ASTM D4402 at 400° F.

In some embodiments, the coating comprises at least one filler. In some embodiments, the coating comprises 10% to 90% by weight of at least one filler based on the total weight of the coating. In some embodiments, the coating comprises 15% to 90% by weight of at least one filler based on the total weight of the coating. In some embodiments, the coating comprises 20% to 90% by weight of at least one filler based on the total weight of the coating. In some embodiments, the coating comprises 25% to 90% by weight of at least one filler based on the total weight of the coating. In some embodiments, the coating comprises 30% to 90% by weight of at least one filler based on the total weight of the coating. In some embodiments, the coating comprises 35% to 90% by weight of at least one filler based on the total weight of the coating. In some embodiments, the coating comprises 40% to 90% by weight of at least one filler based on the total weight of the coating. In some embodiments, the coating comprises 45% to 90% by weight of at least one filler based on the total weight of the coating. In some embodiments, the coating comprises 50% to 90% by weight of at least one filler based on the total weight of the coating. In some embodiments, the coating comprises 55% to 90% by weight of at least one filler based on the total weight of the coating. In some embodiments, the coating comprises 60% to 90% by weight of at least one filler based on the total weight of the coating. In some embodiments, the coating comprises 65% to 90% by weight of at least one filler based on the total weight of the coating. In some embodiments, the coating comprises 70% to 90% by weight of at least one filler based on the total weight of the coating. In some embodiments, the coating comprises 75% to 90% by weight of at least one filler based on the total weight of the coating. In some embodiments, the coating comprises 80% to 90% by weight of at least one filler based on the total weight of the coating. In some embodiments, the coating comprises 85% to 90% by weight of at least one filler based on the total weight of the coating.

In some embodiments, the coating comprises 10% to 85% by weight of at least one filler based on the total weight of the coating. In some embodiments, the coating comprises 10% to 80% by weight of at least one filler based on the total weight of the coating. In some embodiments, the coating comprises 10% to 75% by weight of at least one filler based on the total weight of the coating. In some embodiments, the coating comprises 10% to 70% by weight of at least one filler based on the total weight of the coating. In some embodiments, the coating comprises 10% to 65% by weight of at least one filler based on the total weight of the coating. In some embodiments, the coating comprises 10% to 60% by weight of at least one filler based on the total weight of the coating. In some embodiments, the coating comprises 10% to 55% by weight of at least one filler based on the total weight of the coating. In some embodiments, the coating comprises 10% to 50% by weight of at least one filler based on the total weight of the coating. In some embodiments, the coating comprises 10% to 45% by weight of at least one filler based on the total weight of the coating. In some embodiments, the coating comprises 10% to 40% by weight of at least one filler based on the total weight of the coating. In some embodiments, the coating comprises 10% to 35% by weight of at least one filler based on the total weight of the coating. In some embodiments, the coating comprises 10% to 30% by weight of at least one filler based on the total weight of the coating. In some embodiments, the coating comprises 10% to 25% by weight of at least one filler based on the total weight of the coating. In some embodiments, the coating comprises 10% to 20% by weight of at least one filler based on the total weight of the coating. In some embodiments, the coating comprises 10% to 15% by weight of at least one filler based on the total weight of the coating.

In some embodiments, the at least one filler comprises at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled rubber tires, recycled thermoplastic resins, basalt, roofing granules, graphite, clay, or any combination thereof.

In some embodiments, the coating has a thickness of 10 mils to 200 mils. In some embodiments, the coating has a thickness of 20 mils to 200 mils. In some embodiments, the coating has a thickness of 30 mils to 200 mils. In some embodiments, the coating has a thickness of 40 mils to 200 mils. In some embodiments, the coating has a thickness of mils to 200 mils. In some embodiments, the coating has a thickness of 50 mils to 200 mils. In some embodiments, the coating has a thickness of 60 mils to 200 mils. In some embodiments, the coating has a thickness of 70 mils to 200 mils. In some embodiments, the coating has a thickness of 80 mils to 200 mils. In some embodiments, the coating has a thickness of 90 mils to 200 mils. In some embodiments, the coating has a thickness of 100 mils to 200 mils. In some embodiments, the coating has a thickness of 110 mils to 200 mils. In some embodiments, the coating has a thickness of 120 mils to 200 mils. In some embodiments, the coating has a thickness of 130 mils to 200 mils. In some embodiments, the coating has a thickness of 140 mils to 200 mils. In some embodiments, the coating has a thickness of 150 mils to 200 mils. In some embodiments, the coating has a thickness of 160 mils to 200 mils. In some embodiments, the coating has a thickness of 170 mils to 200 mils. In some embodiments, the coating has a thickness of 180 mils to 200 mils. In some embodiments, the coating has a thickness of 190 mils to 200 mils.

In some embodiments, the coating has a thickness of 10 mils to 20 mils. In some embodiments, the coating has a thickness of 10 mils to 30 mils. In some embodiments, the coating has a thickness of 10 mils to 40 mils. In some embodiments, the coating has a thickness of 10 mils to 50 mils. In some embodiments, the coating has a thickness of 10 mils to mils. In some embodiments, the coating has a thickness of 10 mils to 60 mils. In some embodiments, the coating has a thickness of 10 mils to 70 mils. In some embodiments, the coating has a thickness of 10 mils to 80 mils. In some embodiments, the coating has a thickness of 10 mils to 90 mils. In some embodiments, the coating has a thickness of 10 mils to 100 mils. In some embodiments, the coating has a thickness of 10 mils to 110 mils. In some embodiments, the coating has a thickness of 10 mils to 120 mils. In some embodiments, the coating has a thickness of 10 mils to 130 mils. In some embodiments, the coating has a thickness of 10 mils to 140 mils. In some embodiments, the coating has a thickness of 10 mils to 150 mils. In some embodiments, the coating has a thickness of 10 mils to 160 mils. In some embodiments, the coating has a thickness of 10 mils to 170 mils. In some embodiments, the coating has a thickness of 10 mils to 180 mils. In some embodiments, the coating has a thickness of 10 mils to 190 mils.

In some embodiments, the roofing material comprises a plurality of granules on the coating. In some embodiments, each of the plurality of granules comprises a base particle and a colored coating on a surface of the base particle. In some embodiments, the base particle comprises at least one of greenstone, rhyolite, andesite, basalt, metabasalt, nepheline syenite, ceramic grog, talc, slag, silica sand, greystone, trap rock, granite, siliceous sand, porphyry, marble, syenite, diabase, quartz, slate, sandstone, marine shells, or any combination thereof. In some embodiments, the granule contains an algal or microbial growth inhibitor. In some embodiments, the colored coating comprises a colorant. In some embodiments, the colorant comprises at least one of a pigment, a dye, or any combination thereof. In some embodiments, the colored coating comprises at least one of a reflective pigment, a transition metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, an inorganic pigment, or any combination thereof. Non-limiting examples of pigments and dyes include, without limitation, at least one of an infrared reflective pigment/dye, a phosphorescence pigment/dye, a fluorescence pigment/dye, or any combination thereof. In some embodiments, the colored coating comprises at least one of $TiO_2$, alumina, silica, iron oxide, tin oxide, $SiO_2$, aluminum oxide, mica, rutile, anatase, alloys, aluminum, iron, copper, brass, titanium, cobalt, stainless steel, chromium, nickel, or any combination thereof. In some embodiments, the colored coating comprises water.

In some embodiments, the roofing material comprises 1 granule to 100,000 granules. In some embodiments, the roofing material comprises 1 granule to 10,000 granules. In some embodiments, the roofing material comprises 1 granule to 9,000 granules. In some embodiments, the roofing material comprises 1 granule to 8,000 granules. In some embodiments, the roofing material comprises 1 granule to 7,000 granules. In some embodiments, the roofing material comprises 1 granule to 6,000 granules. In some embodiments, the roofing material comprises 1 granule to 5,000 granules. In some embodiments, the roofing material comprises 1 granule to 4,000 granules. In some embodiments, the roofing material comprises 1 granule to 3,000 granules. In some embodiments, the roofing material comprises 1 granule to 2,000 granules. In some embodiments, the roofing material comprises 1 granule to 1,000 granules. In some embodiments, the roofing material comprises 1,000 granules to 10,000 granules. In some embodiments, the roofing material comprises 2,000 granules to 10,000 granules. In some embodiments, the roofing material comprises 3,000 granules to 10,000 granules. In some embodiments, the roofing material comprises 4,000 granules to 10,000 granules. In some embodiments, the roofing material comprises 5,000 granules to 10,000 granules. In some embodiments, the roofing material comprises 6,000 granules to 10,000 granules. In some embodiments, the roofing material comprises 7,000 granules to 10,000 granules. In some embodiments, the roofing material comprises 8,000 granules to 10,000 granules. In some embodiments, the roofing material comprises 9,000 granules to 10,000 granules.

Some embodiments relate to a roofing shingle. In some embodiments, the roofing shingle comprises a substrate. In some embodiments, the roofing shingle comprises a coating on the substrate. In some embodiments, the roofing shingle comprises a plurality of granules on the coating. In some embodiments, the coating comprises 10% to 90% by weight of a polymer-modified asphalt composition. In some embodiments, the polymer-modified asphalt composition comprises at least 80% by weight of an asphalt based on a total weight of the polymer-modified asphalt composition. In some embodiments, the polymer-modified asphalt composition comprises a polyolefin. In some embodiments, the polyolefin has a number average molecular weight of at least 25 kDa. In some embodiments, the polymer-modified asphalt composition comprises an ethylene vinyl acetate copolymer. In some embodiments, the coating comprises 10% to 90% by weight of at least one filler based on the total weight of the coating.

Some embodiments relate to a roofing system. In some embodiments, the roofing system comprises a roof substrate. In some embodiments, the roofing system comprises a first roofing shingle. In some embodiments, the roofing system comprises a second roofing shingle. In some embodiments, the first roofing shingle and the second roofing shingle are secured to the roof substrate. In some embodiments, a portion of the first roofing shingle overlaps a portion of the second roofing shingle. In some embodiments, each of the first roofing shingle and the second roofing shingle comprises a substrate. In some embodiments, each of the first roofing shingle and the second roofing shingle comprises a coating on the substrate. In some embodiments, each of the first roofing shingle and the second roofing shingle comprises a plurality of granules on the coating. In some embodiments, the coating comprises 10% to 90% by weight of a polymer-modified asphalt composition. In some embodiments, the polymer-modified asphalt composition comprises at least 80% by weight of an asphalt based on a total weight of the polymer-modified asphalt composition. In some embodiments, the polymer-modified asphalt composition comprises a polyolefin. In some embodiments, the polyolefin has a number average molecular weight of at least 25 kDa. In some embodiments, the polymer-modified asphalt composition comprises an ethylene vinyl acetate copolymer. In some embodiments, the coating comprises 10% to 90% by weight of at least one filler based on the total weight of the coating.

FIG. 1 is a schematic diagram of a roofing material 100, according to some embodiments. In some embodiments, the roofing material 100 is a roofing shingle. In some embodiments, the roofing material 100 comprises a substrate 102. In some embodiments, the roofing material 100 comprises a coating 104 located on or above a top surface of the substrate 102. In some embodiments, the coating 104 covers the top surface of the substrate 102. In some embodiments, the coating 104 directly contacts the top surface of the substrate 102. In some embodiments, the coating 104 impregnates the top surface of the substrate 102. In some embodiments, the coating 104 is adhered to the top surface of the substrate 102. In some embodiments, the coating 104 is bonded to the top surface of the substrate 102. In some embodiments, the roofing material 100 comprises a coating 106 located on or above a bottom surface of the substrate. In some embodiments, the roofing material 100 comprises an intervening layer between the coating 104 and the substrate 102. In some embodiments, the coating 106 covers the bottom surface of the substrate 102. In some embodiments, the coating 106 directly contacts the bottom surface of the substrate 102. In some embodiments, the coating 106 impregnates the bottom surface of the substrate 102. In some embodiments, the coating 106 is adhered to the bottom surface of the substrate 102. In some embodiments, the coating 106 is bonded to the bottom surface of the substrate 102. In some embodiments, the roofing material 100 comprises an intervening layer between the coating 106 and the substrate 102. In some embodiments, the roofing material 100 comprises a plurality of granules 108 located on or above the coating 104. In some embodiments, the plurality of granules 108 directly contacts the coating 104. In some embodiments, the plurality of granules is embedded in the coating 104.

Figure 2:
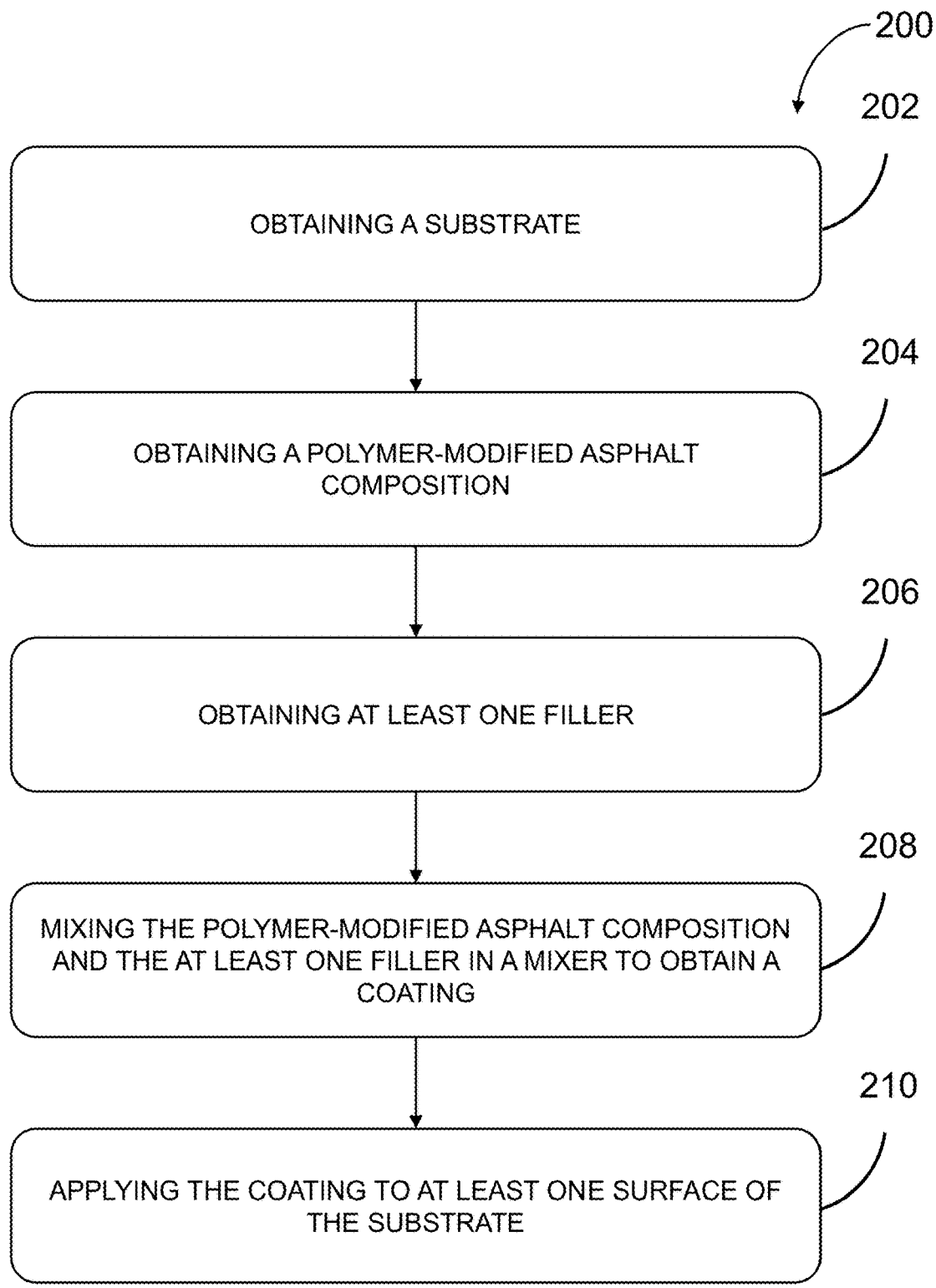
FIG. 2 is a flowchart of a method of manufacturing, according to some embodiments.

FIG. 2 is a flowchart of a method of manufacturing 200 a roofing material, according to some embodiments. As shown in FIG. 2, the method of manufacturing 200 may comprise one or more of the following steps: obtaining 202 a substrate; obtaining 204 a polymer-modified asphalt composition; obtaining 206 at least one filler; mixing 208 the polymer-modified asphalt composition and the at least one filler in a mixer to obtain a coating; and applying 210 the coating to at least one surface of the substrate. Any of the polymer-modified asphalt compositions and/or coatings of this disclosure may be used herein, without departing from the scope of this disclosure. In some embodiments, the method of manufacturing 200 further comprises obtaining a plurality of granules and applying the plurality of granules to the coating.

In some embodiments, the roofing material is configured to be prepared on a substantially standard manufacturing line for asphaltic shingles at a standard speed, ranging from 110 FPM to 1000 FPM. In some embodiments, the roofing material is configured to be prepared on a substantially standard manufacturing line for asphaltic shingles at a standard speed, ranging from 200 FPM to 1000 FPM. In some embodiments, the roofing material is configured to be prepared on a substantially standard manufacturing line for asphaltic shingles at a standard speed, ranging from 350 FPM to 1000 FPM. In some embodiments, the roofing material is configured to be prepared on a substantially standard manufacturing line for asphaltic shingles at a standard speed, ranging from 500 FPM to 1000 FPM. In some embodiments, the roofing material is configured to be prepared on a substantially standard manufacturing line for asphaltic shingles at a standard speed, ranging from 600 FPM to 1000 FPM. In some embodiments, the roofing material is configured to be prepared on a substantially standard manufacturing line for asphaltic shingles at a standard speed, ranging from 750 FPM to 1000 FPM. In some embodiments, the roofing material is configured to be prepared on a substantially standard manufacturing line for asphaltic shingles at a standard speed, ranging from 900 FPM to 1000 FPM. A non-limiting example of a substantially standard manufacturing line for asphaltic shingles is detailed in U.S. Pat. No. 10,195,640, the contents of which are hereby incorporated reference.

In some embodiments, the mixing comprises at least one of contacting, combining, agitating, stirring, tumbling, sonicating, or any combination thereof, among other techniques for mixing two or more components together. In some embodiments, the mixer is a low shear mixer. In some embodiments, the mixer is a high shear mixer. In some embodiments, the coating is prepared by mixing the various components using at least one of static mixing, a low shear mixer, a high shear mixer, or any combination thereof. A non-limiting example of a low shear mixer is EUROSTAR® 60 Digital, IKA Works, Inc., Wilmington, NC, which mixes batches at about 500 to 1500 RPM, with a paddle-type blade to generate low shear. A non-limiting example of a high shear mixer is SILVERSON® L5M-A Laboratory Mixer, Silverson Machines, Inc., East Longmeadow, MA, which mixes batches at or above 3200 RPM, with a blade and a head that are configured to generate high shear, as well as heat mixing. In some embodiments, the mixing of the coating is conducted at an ambient temperature (e.g., about 70° Fahrenheit). In some embodiments, the mixing is conducted at a temperature of 300° F. to 425° F. In some embodiments, after mixing, the coating is allowed to dry at an ambient temperature (e.g., about 70° Fahrenheit). In another embodiment, after mixing, the coating is dried in an oven at about 90° F. to 140° F.

In some embodiments, the mixing is conducted at a temperature of 300° F. to 425° F. In some embodiments, the mixing is conducted at a temperature of 305° F. to 425° F. In some embodiments, the mixing is conducted at a temperature of 310° F. to 425° F. In some embodiments, the mixing is conducted at a temperature of 315° F. to 425° F. In some embodiments, the mixing is conducted at a temperature of 320° F. to 425° F. In some embodiments, the mixing is conducted at a temperature of 325° F. to 425° F. In some embodiments, the mixing is conducted at a temperature of 330° F. to 425° F. In some embodiments, the mixing is conducted at a temperature of 335° F. to 425° F. In some embodiments, the mixing is conducted at a temperature of 340° F. to 425° F. In some embodiments, the mixing is conducted at a temperature of 345° F. to 425° F. In some embodiments, the mixing is conducted at a temperature of 350° F. to 425° F. In some embodiments, the mixing is conducted at a temperature of 355° F. to 425° F. In some embodiments, the mixing is conducted at a temperature of 360° F. to 425° F. In some embodiments, the mixing is conducted at a temperature of 365° F. to 425° F. In some embodiments, the mixing is conducted at a temperature of 370° F. to 425° F. In some embodiments, the mixing is conducted at a temperature of 375° F. to 425° F. In some embodiments, the mixing is conducted at a temperature of 380° F. to 425° F. In some embodiments, the mixing is conducted at a temperature of 385° F. to 425° F. In some embodiments, the mixing is conducted at a temperature of 390° F. to 425° F. In some embodiments, the mixing is conducted at a temperature of 395° F. to 425° F. In some embodiments, the mixing is conducted at a temperature of 400° F. to 425° F. In some embodiments, the mixing is conducted at a temperature of 405° F. to 425° F. In some embodiments, the mixing is conducted at a temperature of 410° F. to 425° F. In some embodiments, the mixing is conducted at a temperature of 415° F. to 425° F. In some embodiments, the mixing is conducted at a temperature of 420° F. to 425° F.

In some embodiments, the mixing is conducted at a temperature of 300° F. to 305° F. In some embodiments, the mixing is conducted at a temperature of 300° F. to 310° F. In some embodiments, the mixing is conducted at a temperature of 300° F. to 315° F. In some embodiments, the mixing is conducted at a temperature of 300° F. to 320° F. In some embodiments, the mixing is conducted at a temperature of 300° F. to 325° F. In some embodiments, the mixing is conducted at a temperature of 300° F. to 330° F. In some embodiments, the mixing is conducted at a temperature of 300° F. to 335° F. In some embodiments, the mixing is conducted at a temperature of 300° F. to 340° F. In some embodiments, the mixing is conducted at a temperature of 300° F. to 345° F. In some embodiments, the mixing is conducted at a temperature of 300° F. to 350° F. In some embodiments, the mixing is conducted at a temperature of 300° F. to 355° F. In some embodiments, the mixing is conducted at a temperature of 300° F. to 360° F. In some embodiments, the mixing is conducted at a temperature of 300° F. to 365° F. In some embodiments, the mixing is conducted at a temperature of 300° F. to 370° F. In some embodiments, the mixing is conducted at a temperature of 300° F. to 375° F. In some embodiments, the mixing is conducted at a temperature of 300° F. to 380° F.

In some embodiments, the mixing is conducted at a temperature of 300° F. to 385° F. In some embodiments, the mixing is conducted at a temperature of 300° F. to 390° F. In some embodiments, the mixing is conducted at a temperature of 300° F. to 395° F. In some embodiments, the mixing is conducted at a temperature of 300° F. to 400° F. In some embodiments, the mixing is conducted at a temperature of 300° F. to 405° F. In some embodiments, the mixing is conducted at a temperature of 300° F. to 410° F. In some embodiments, the mixing is conducted at a temperature of 300° F. to 415° F. In some embodiments, the mixing is conducted at a temperature of 300° F. to 420° F.

In some embodiments, the mixing is conducted in an extruder and/or a high shear mixer at 330° F. to 425° F., and then the resulting coating is discharged from the high shear mixer at 330° F. to 410° F. and roll pressed into sheets. In some embodiments, the coating is discharged from the mixer at a temperature of 330° F. to 400° F. In some embodiments, the coating is discharged from the mixer at a temperature of 330° F. to 390° F. In some embodiments, the coating is discharged from the mixer at a temperature of 330° F. to 380° F. In some embodiments, the coating is discharged from the mixer at a temperature of 330° F. to 375° F. In some embodiments, the coating is discharged from the mixer at a temperature of 330° F. to 360° F. In some embodiments, the coating is discharged from the mixer at a temperature of 330° F. to 350° F. In some embodiments, the coating is discharged from the mixer at a temperature of 330° F. to 340° F. In some embodiments, the coating is pressed into a glass mat. According to one embodiment, once the coating is roll pressed, it is capped with granules and cut to the desired shape.

In some embodiments, the coating is in the form of a pourable coating formulation that is mixed at 300° F. to 425° F. or 330° F. to 410° F. in an extruder and/or low shear mixer. In some embodiments, the pourable coating formulation, which is generally at 380° F. to 420° F. after mixing, is then poured onto a glass mat on one or both sides and roll pressed to impregnate and saturate the mat. In some embodiments, granules are then applied and the roofing material (e.g., shingle(s)) is cut to the desired shape.

In one embodiment, the step of applying the coating to the surface of the substrate to form the roofing material is conducted on a substantially standard manufacturing line for asphaltic shingles at a standard speed, ranging from 110 FPM to 1000 FPM. As discussed above, a non-limiting example of a substantially standard manufacturing line for asphaltic shingles is detailed in U.S. Pat. No. 10,195,640, the contents of which are hereby incorporated reference. In some embodiments, the applying comprises at least one of contacting, disposing, pouring, immersing, dipping, brushing, coating, spraying, or any combination thereof, among other techniques for bringing the coating into direct or indirect contact with the substrate.

In some embodiments, the roofing material is a roofing shingle. In some embodiments, the roofing shingle is one of (i) a single layer shingle or (ii) a laminated shingle having two or more layers.

In some embodiments, the roofing material comprises one or more layers of the coating, discussed above. In some embodiments, the roofing material comprises one (1) to two (2) layers of the coating. In some embodiments, the roofing material comprises one (1) to three (3) layers of the coating. In some embodiments, the roofing material comprises one (1) to four (4) layers of the coating. In some embodiments, the roofing material comprises one (1) to five (5) layers of the coating. In some embodiments, the roofing material comprises one (1) to six (6) layers of the coating. In some embodiments, the roofing material comprises one (1) to seven (7) layers of the coating. In some embodiments, the roofing material comprises one (1) to eight (8) layers of the coating. In some embodiments, the roofing material comprises one (1) to nine (9) layers of the coating. In some embodiments, the roofing material comprises one (1) to ten (10) layers of the coating. In some embodiments, the roofing material comprises two (2) to ten (10) layers of the coating. In some embodiments, the roofing material comprises three (3) to ten (10) layers of the coating. In some embodiments, the roofing material comprises five (5) to ten (10) layers of the coating. In some embodiments, the roofing material comprises seven (7) to ten (10) layers of the coating.

In some embodiments, the coating comprises at least one layer that is applied to both a top surface and a bottom surface of the substrate. In some embodiments, the coating is embedded in the substrate to form a coated substrate.

In some embodiments, the method of manufacturing further comprises obtaining a plurality of granules. In some embodiments, the plurality of granules are applied to a surface of the roofing material (e.g., shingle). In some embodiments, the roofing material includes mineral surfacing, such as, e.g., fines, granules, sand, metal flakes and/or reflective granules. In some embodiments, the method includes applying polymer films and/or synthetic and/or natural non-woven and/or woven fabrics, with or without decorative elements, including, for example, printing, embossing and/or protective coatings, to the coating. In some embodiments, photo (e.g., UV) and/or thermal stabilizers are added to a surface of the coating and/or roofing material.

Example 1

Process for Preparing PMA Composition

Sample 1. Asphalt (Asphalt #1, 650 g) was added to a canister. The canister was placed in an oven heated to 180° C. for 2 hours. Thereafter, the canister was removed from the oven and transferred to a heating mantle. A paddle mixer attached to an overhead stirrer was then submerged in the asphalt and the asphalt was mixed at a mixing speed of 100 rpm to 400 rpm. When the temperature of the asphalt reached 160° C., an ethylene vinyl acetate (EVA) copolymer (EVA #2, 61 g) was added to the asphalt under mixing. Upon completing the addition of the EVA copolymer, recycled low density polyethylene (rLDPE #1, 54 g) was added to the asphalt and EVA copolymer mixture. Mixing continued for another 4 hours at a mixing speed 100 rpm to 400 rpm. After mixing, the paddle mixer was removed from the asphalt and the resulting polymer modified asphalt composition was poured for physical property testing. This process for preparing Sample 1 is representative of the process employed for the other samples described herein.

Example 2

Properties of PMA Compositions

Various PMA compositions were prepared according to the process described in Example 1. The properties of the PMA compositions were tested and are summarized in Table 1 below. The measured properties included the softening point (° F.) as measured according to ASTM D3461, the viscosity (centipoise or cP) as measured according to ASTM D4402 at 400° F., and the penetration point (dmm) at 77° F. as measured according to ASTM D5. Unless otherwise provided in these examples, all percentages by weight are based on a total weight of the polymer-modified asphalt formulation.

TABLE 1

Properties of PMA Formulations Using Different Asphalts

| Sample | Asphalt | EVA | Polyolefin | SP (° F.) | Viscosity (cP) | Pen (dmm) |
|---|---|---|---|---|---|---|
| Sample 1 | Asphalt #1, 85% | EVA #2, 8% | rLDPE#1, 7% | 237 | 277 | 15 |
| Sample 2 | PG 64-16, 86% | EVA #2, 8% | rLDPE#1, 6% | 236 | 271 | 18 |
| Sample 3 | PG 64-22 #1, 86% | EVA #2, 8% | rLDPE #1, 6% | 216 | 428 | 20 |
| Sample 4 | PG 64-16, 86% | EVA #1, 8% | rLDPE #1, 6% | 194 | 335 | 22 |
| Sample 5 | PG 64-22 #2, 86% | EVA #2, 8% | rLDPE #1, 6% | 226 | 763 | 27 |
| Sample 6 | Asphalt #2, 85% | EVA #2, 8% | rLDPE #1, 7% | 221 | 630 | 35 |

As shown in Table 1, the polymer-modified asphalt compositions meet the requirements for asphalt under ASTM D3462. These requirements include a softening point of between 190° F. to 320° F. and a penetration point of 15 dmm or greater at 77° F.

Example 3

Properties of PMA Compositions

Various PMA compositions were prepared according to the process described in Example 1. The properties of the PMA compositions were tested and are summarized in Table 2 below. The measured properties included the softening point (° F.) as measured according to ASTM D3461, the viscosity (centipoise or cP) as measured according to ASTM D4402 at 400° F., and the penetration point (dmm) at 77° F. as measured according to ASTM D5.

TABLE 2

Properties of PMA Compositions With Varying Asphalt Contents

| Sample | Asphalt | EVA | Polyolefin | SP (° F.) | Viscosity (cP) | Pen (dmm) |
|---|---|---|---|---|---|---|
| Sample 7 | PG 70-10, 80% | EVA #8, 10% | rLDPE #1, 10% | 230 | 2062 | 13 |
| Sample 8 | PG 70-10, 80% | EVA #7, 10% | rLDPE #1, 10% | 235 | 1444 | 12 |
| Sample 9 | PG 70-10, 84% | EVA #7, 8% | rLDPE #1, 8% | 240 | 542 | 13 |
| Sample 10 | PG 70-10, 84% | EVA #2, 8% | rLDPE #1, 8% | 240 | 649 | 15 |
| Sample 11 | PG 70-10, 85% | EVA #2, 8% | rLDPE #1, 7% | 218 | 358 | 18 |

At 80% by weight of asphalt, Sample 7 and Sample 8 met the softening point requirements for asphalt under ASTM D3462, but not the penetration point requirements of 15 dmm or greater. In addition, the viscosity of Sample 7 and Sample 8 was higher than acceptable levels for standard manufacturing lines for roofing shingles and thus, to be used, would require modification or upgrades to existing equipment.

When the weight percentage of the asphalt was increased to 84%, with a corresponding reducing in the weight percentage of each of the ethylene vinyl acetate copolymer and the polyolefin to 8% by weight, the properties of Sample 9 and Sample 10 unexpectedly improved. More specifically, Sample 9 and Sample 10 unexpectedly met penetration point requirements for asphalt under ASTM D3462 and the viscosity of each sample was reduced to levels suitable for standard manufacturing lines for roofing shingles.

When the weight percentage of the asphalt was further increased further to 85%, with a further reduction in the weight percentage of the polyolefin to 7%, even further unexpected improvements in the properties of Sample 11 were observed. More specifically, the softening point, viscosity, and penetration point of Sample 11 markedly improved relative to Sample 7 and Sample 8, as well as Sample 9 and Sample 10.

The melt flow index and vinyl acetate of the various grades of ethylene vinyl acetate copolymers used in Samples 7 to 11 are summarized in Table 3 below. The melt flow index was measured at 190° C./2.16 kg according to ISO 1133 and is provided in units of g/min. The vinyl acetate content is provided as a weight percentage, wherein the weight percentage is based on a total weight of the ethylene vinyl acetate copolymer.

TABLE 3

Properties of EVAs

| EVA | Melt Flow Index | Vinyl Acetate Content |
|---|---|---|
| EVA #8 | 6 | 28 |
| EVA #7 | 25 | 28 |
| EVA #2 | 43 | 28 |

Various grades of polyethylene were used to prepare polymer-modified asphalt compositions. The properties of the PMA compositions were tested and are summarized in Table 4 below. The measured properties included the softening point (° F.) as measured according to ASTM D3461, the viscosity (centipoise or cP) as measured according to ASTM D4402 at 400° F., and the penetration point (dmm) at 77° F. as measured according to ASTM D5.

TABLE 4

Comparison of Properties of PMA Compositions Using Different Polyethylene

| Sample | Asphalt | EVA | Polyolefin | SP (° F.) | Viscosity (cP) | Pen (dmm) |
|---|---|---|---|---|---|---|
| Sample 1 | Asphalt #1, 85% | EVA #2, 8% | rLDPE #1, 7% | 237 | 277 | 15 |
| Sample 12 | Asphalt #1, 86% | EVA #2, 8% | rLDPE #1, 6% | 217 | 228 | 18 |
| Sample 13 | Asphalt #1, 86% | EVA #2, 8% | rLDPE #3, 6% | 209 | 242 | 20 |
| Sample 14 | Asphalt #1, 86% | EVA #2, 8% | rLDPE #4, 6% | 216 | 252 | 18 |
| Sample 15 | Asphalt #1, 86% | EVA #2, 8% | rLDPE #2, 6% | 139 | 223 | 30 |
| Sample 16 | Asphalt #1, 86% | EVA #2, 8% | rHDPE #1, 6% | 140 | 236 | 22 |
| Sample 17 | Asphalt #1, 85% | EVA #2, 15% | none | 139 | 248 | 36 |
| Sample 18 | PG 64-16, 86% | EVA #3, 8% | rLDPE #1 | 221 | 342 | 21 |
| Sample 19 | PG 64-16, 86% | EVA #3, 8% | Virgin LDPE | 140 | 250 | 31 |

As shown in Table 4, the inclusion and grade of polyethylene was a factor in whether the polymer-modified asphalt composition met the softening point requirements or not. Sample 17 did not include any polyethylene and the softening point of Sample 17 did not meet the minimum temperature of 190° F. according to ASTM D3462. The polyethylene used in Sample 15 and Sample 16 did not significantly increase the softening point in comparison to Sample 17. The polyethylene used in Sample 1, Sample 12, Sample 13, Sample 14, and Sample 18 increased the softening point above the minimum temperature of 190° F. according to ASTM D3462.

The number average molecular weight, the weight average molecular weight, the Z-average molecular weight, and the polydispersity for the various polyethylene grades employed are summarized in Table 5 below.

TABLE 5

Molecular Weight Data for the Various Polyethylene

| Polyethylene | MWn | MWw | MWz | PD |
|---|---|---|---|---|
| rLDPE #1 | 40,100 | 292,000 | 1,315,000 | 7 |
| rLDPE #2 | 24,950 | 247,500 | 873,000 | 10 |
| rLDPE #3 | 45,000 | 229,000 | 604,500 | 5 |
| virgin LDPE | 18,600 | 198,500 | 864,500 | 11 |

In review of the data provided in Table 5, the number average molecular weight and the polydispersity of the polyethylene were each independently controlling factors in whether the PMA compositions met the property requirements of ASTM D3462. The correlation of the weight average and z-average molecular weights to the properties of the PMA compositions was weak and often resulted in conflicting results. For example, the polyethylene used in Sample 15 did not sufficiently raise the softening point, and the polyethylene used in Sample 15 had a weight average molecular weight between the weight average molecular weight of two different polyethylenes—i.e., Sample 1, Sample 12, Sample 13, and Sample 18—that increased the softening point to suitable levels. Compare also Sample 18 and Sample 19.

Polyethylene wax and polypropylene wax, both of which are low number average molecular weight polymers with a range of 300 Da to 10,000 Da for polyethylene wax and a range of 5,000 to 30,000 Da for polypropylene wax, were used in formulations to further support the data above which showed number average molecular weight was a controlling factor in determining whether the PMA compositions would meet the property requirements of ASTM D3462.

TABLE 6

Physical Property Data of EVA PMAs with Different Polyolefins

| Sample | Asphalt | EVA | Polyolefin (PO) | SP (° F.) | Viscosity (cP) | Pen (dmm) |
|---|---|---|---|---|---|---|
| Sample 2 | PG 64-16, 86% | EVA #2, 8% | rLDPE #1, 6% | 236 | 271 | 18 |
| Sample 20 | PG 64-16, 100% | none | None | 123 | 24 | 47 |
| Sample 21 | PG 64-16, 86% | EVA #2, 8% | PO WAX #1, 6% | 168 | 96 | 39 |
| Sample 22 | PG 64-16, 86% | EVA #2, 8% | PO WAX #2, 6% | 164 | 113 | 29 |
| Sample 23 | PG 64-16, 84% | EVA #2, 8% | PO WAX #1, 2% + rLDPE #1, 6% | 205 | 285 | 21 |
| Sample 24 | PG 64-16, 86% | none | PO WAX #1, 14% | 222 | 24 | 20 |
| Sample 25 | PG 64-16, 86% | EVA #2, 8% | PO WAX #3, 6% | 176 | 100 | 35 |

Sample 2 provided a comparison for the samples with polyolefin waxes. Sample 20 without any ethylene vinyl acetate copolymer and without any polyolefin did not meet the minimum requirements for softening point under ASTM D3462. Sample 21 and Sample 22 each used a different polyethylene wax, both of which did not raise the softening point to the required minimum softening point. When a higher number average molecular weight polyethylene was added, as in Sample 23, the softening point increased above the 190° F. minimum temperature. Sample 24 did not include any ethylene vinyl acetate copolymer and only used a polyethylene wax as a modifier. The softening point increased, but the viscosity was an order of magnitude lower than the viscosity range for standard manufacturing lines for roofing shingles, which is problematic. Sample 25 used a polypropylene wax, which also did not raise the softening point to the required minimum. Accordingly, polyolefins with higher number average molecular weights, relative to polyolefin waxes, improved the properties of the PMA compositions.

Various PMA compositions with different ethylene vinyl acetate copolymers were prepared according to the process described in Example 1. The properties of the PMA compositions were tested and are summarized in Table 7 below. The measured properties included the softening point (° F.) as measured according to ASTM D3461, the viscosity (centipoise or cP) as measured according to ASTM D4402 at 400° F., and the penetration point (dmm) at 77° F. as measured according to ASTM D5. In addition, the vinyl acetate content and melt flow index of the various ethylene vinyl acetate copolymers is summarized in Table 8. The melt flow index was measured at 190° C./2.16 kg according to ISO 1133 and is provided in units of g/min. The vinyl acetate content is provided as a weight percentage, wherein the weight percentage is based on a total weight of the ethylene vinyl acetate copolymer.

TABLE 7

Properties of PMA Compositions With Different EVA Copolymers

| Sample | Asphalt | EVA | Polyolefin | SP (° F.) | Viscosity (cP) | Pen (dmm) |
|---|---|---|---|---|---|---|
| Sample 4 | PG 64-16, 86% | EVA #1, 8% | rLDPE #1, 6% | 194 | 335 | 22 |
| Sample 26 | PG 64-16, 86% | EVA #2, 8% | rLDPE #1, 6% | 210 | 252 | 28 |
| Sample 27 | PG 64-16, 86% | EVA #3, 8% | rLDPE #1, 6% | 220 | 341 | 25 |
| Sample 28 | PG 64-16, 86% | EVA #4, 8% | rLDPE #1, 6% | 182 | 256 | 35 |
| Sample 29 | PG 64-16, 86% | EVA #5, 8% | rLDPE #1, 6% | 176 | 270 | 40 |

TABLE 7-continued

Properties of PMA Compositions With Different EVA Copolymers

| Sample | Asphalt | EVA | Polyolefin | SP (° F.) | Viscosity (cP) | Pen (dmm) |
|---|---|---|---|---|---|---|
| Sample 30 | PG 64-16, 86% | EVA #6, 8% | rLDPE #1, 6% | 184 | 346 | 20 |
| Sample 31 | PG 64-16, 86% | EVA #7, 8% | rLDPE #1, 6% | 193 | 280 | 25 |
| Sample 32 | PG 64-16, 86% | EVA #8, 8% | rLDPE #1, 6% | 189 | 464 | 22 |
| Sample 33 | PG 64-16, 86% | EVA #9, 8% | rLDPE #1, 6% | 217 | 182 | 25 |

TABLE 8

Properties of Ethylene Vinyl Acetate Copolymers

| EVA | VA Content % | Melt Index (g/10 min) |
|---|---|---|
| EVA #1 | 18 | 30 |
| EVA #2 | 28 | 43 |
| EVA #3 | 25 | 19 |
| EVA #4 | 32 | 43 |
| EVA #5 | 40 | 52 |
| EVA #6 | 18 | 30 |
| EVA #7 | 28 | 25 |
| EVA #8 | 28 | 6 |
| EVA #9 | 28 | 150 |

As shown in Table 7 and Table 8, the softening points and viscosities of PMA compositions comprising ethylene vinyl acetate copolymers with varying vinyl acetate content was markedly different. Sample 28, Sample 29 and Sample 32 did not meet the minimum softening point requirements of ASTM D3462. Based on Table 7 and Table 8, ethylene vinyl acetate copolymers with a vinyl acetate content of 18% to 28% and a melt flow index of 6 g/10 min to 150 g/10 min improved the properties of the PMA compositions.

Figure 3:
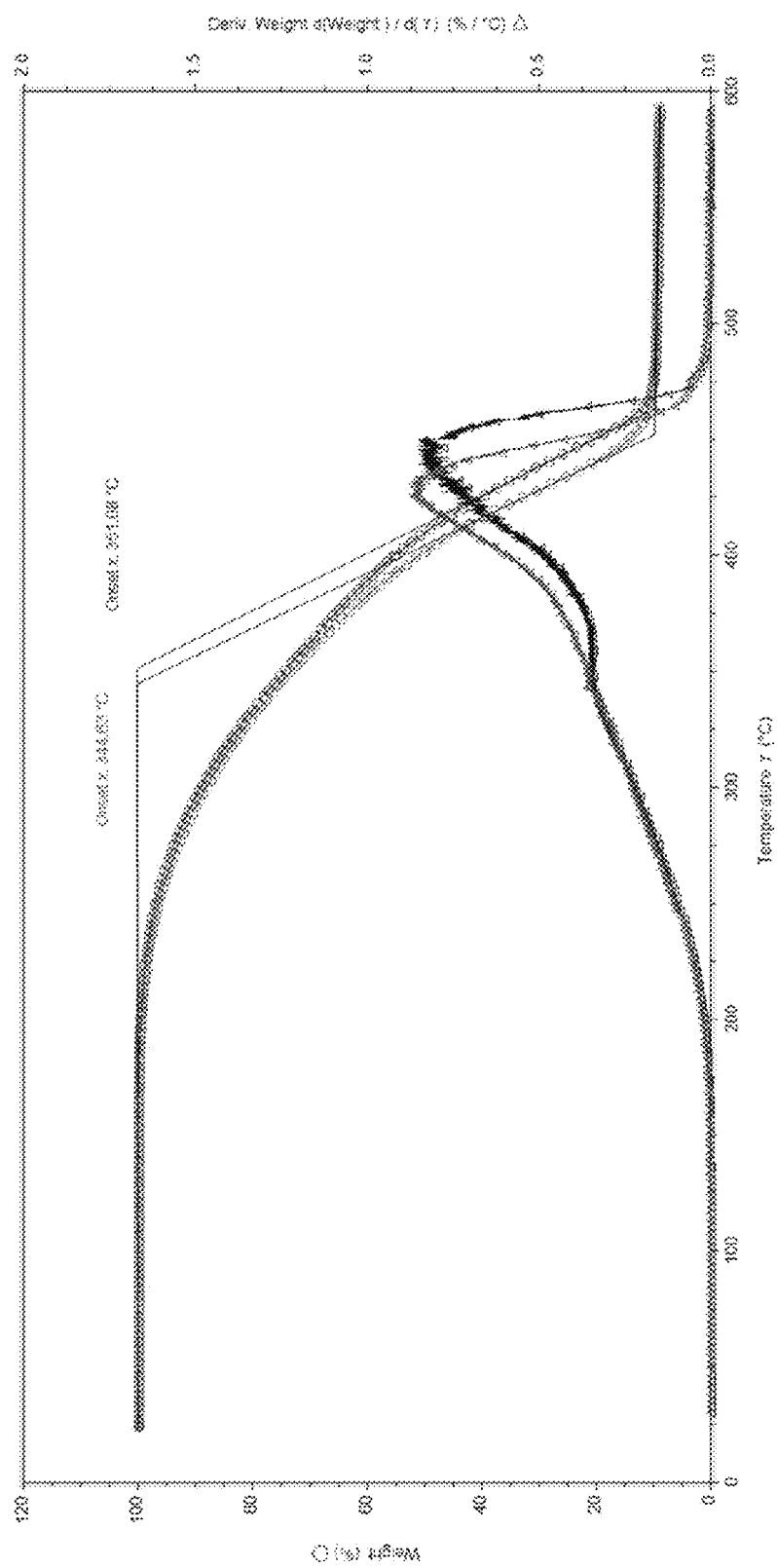
FIG. 3 is a graphical view of thermogravimetric analysis profile comparison of a control and a polymer-modified asphalt composition, according to some embodiments.

The thermal stability of the PMA compositions was evaluated and compared to a conventional SBS-modified PMA composition (Control). Four samples were tested on a Thermogravimetric Analysis (Model TGA 550, TA Instruments), where the mass of a sample was monitored as a function of temperature. To evaluate thermal stability, each sample, with a weight of 12±1 mg, was heated at 10° C. per min from 25° C. to 600° C., in an atmosphere of nitrogen. A profile comparison between the control 33 and Sample 12 is presented in FIG. 3. Sample 12 suppressed the thermal decomposition at about 350° C., as shown in the derivative curve (triangles) with respect to the Y-axis on the right-hand side. This was characterized as the onset temperature of the step change in the weight percentage with respect to the Y-axis on the left-hand side. The results are summarized in Table 9, which clearly indicates that the PMA compositions had better thermal stability relative to the control.

TABLE 9

Thermal stability of PMA samples from TGA tests.

| Sample | Asphalt | Polymer | Temperature Onset (° C.) |
|---|---|---|---|
| Control | Asphalt #1, 92% | 8% SBS | 345 |
| Sample 12 | Asphalt #1, 86% | 8% EVA #2; 6% rLDPE | 351 |
| Sample 14 | Asphalt #1, 86% | 8% EVA #2; 6% LDPE #2 | 358 |
| Sample 13 | Asphalt #1, 86% | 8% EVA #2; 6% LDPE #1 | 360 |

Various polymer-modified asphalt compositions were mixed with a mineral filler (CaCO$_3$) to form a polymer-modified asphalt filled coating. The properties of the polymer-modified asphalt filled coating were measured and are summarized in Table 1 below. The measured properties included the softening point (F) as measured according to ASTM D3461, the viscosity (centipoise or cP) as measured according to ASTM D4402 at 400° F., and the penetration point (dmm) at 77° F. as measured according to ASTM D5. Unless otherwise provided below, the weight percentage of the mineral filler was 65% by weight based on a total weight of the polymer-modified asphalt filled coating. The control is commercially available and is an asphalt coating in which the asphalt is modified by poly(styrene-butadiene-styrene) (SBS).

TABLE 10

Filled Coating Properties of the EVA PMAs.

| Coating | Asphalt | EVA | polyolefin | SP, ° F. | Visc (400° F.), cps | pen (77° F.), dmm |
|---|---|---|---|---|---|---|
| Control | PMA (commercial), 68% filler | N/A | N/A | 249 | 3648 | 15 |
| Sample 12 | Asphalt #1, 86% | EVA #2, 8% | rLDPE #1, 6% | 219 | 3597 | 13 |
| Sample 1 | Asphalt #1, 85% | EVA #2, 8% | rLDPE #1, 7% | 240 | 5648 | 12 |
| Sample 2 | PG 64-16, 86% | EVA #2, 8% | rLDPE #1, 6% | 200 | 3704 | 13 |
| Sample 18 | PG 64-16, 86% | EVA #3, 8% | rLDPE #1, 6% | 214 | 5904 | 11 |
| Sample 4 | PG 64-16, 86% | EVA #1, 8% | rLDPE #1, 6% | 230 | 5696 | 9 |
| Sample 13 | Asphalt #1, 86% | EVA #2, 8% | rLDPE #1, 6% | 223 | 3200 | 12 |

TABLE 10-continued

Filled Coating Properties of the EVA PMAs.

| Coating | Asphalt | EVA | polyolefin | SP, °F. | Visc (400° F.), cps | pen (77° F.), dmm |
|---|---|---|---|---|---|---|
| Sample 14 | Asphalt #1, 86% | EVA #2, 8% | rLDPE #2, 6% | 227 | 3440 | 11 |

As shown in Table 10, each of the polymer-modified asphalt filled coatings has a softening point within a range that is suitable for use in roofing shingles. In addition, each of the polymer-modified asphalt filled coatings has a viscosity within a range that permits processing of the polymer-modified asphalt filled coating on standard manufacturing lines for roofing shingles. Further, each of the polymer-modified asphalt filled coatings has a penetration point that reduces, when used in roofing shingles, the tendency of roofing shingles to be bound together when packaged and stacked on pallets.

Coupons were prepared using the polymer-modified asphalt filled coatings presented in Table 10. Roofing granules were applied to each of the coupons. The coupons were tested for roofing shingle properties, which are summarized in Table 11 below. The measured properties include tensile strength (lb-f) as measured according to ASTM 5147, tear strength (g-f) as measured according to ASTM D1922 as modified by ASTM D228, fastener pull (lb-f) as measured according to ASTM D3462, and rub loss (g) as measured according to ASTM D4977.

TABLE 11

Lab coupon testing results

| | Tensile Strength, lb-f | | Tear strength, g-f | | Fastener pull, | rub loss, |
|---|---|---|---|---|---|---|
| STAT | MD | CD | MD | CD | lb-f | g |
| Sample 12 | 129 | 42 | 920 | 1553 | 38 | 0.8 |
| Sample 1 | 131 | TBD | TBD | 1657 | 37 | 3 |
| Sample 2 | 132 | TBD | TBD | 1553 | 37 | 0.6 |
| Sample 18 | 128 | 44 | 1077 | 1536 | 38 | 0.7 |
| Sample 13 | 130 | 41 | 991 | 1618 | 35 | 1 |
| Sample 14 | 124 | 37 | 996 | 1532 | 36 | 1 |

As shown in Table 11, the polymer-modified asphalt filled coatings exhibit a machine direction tensile strength, cross machine direction tensile strength, machine direction tear strength, cross machine direction tear strength, fastener pull, and rub loss suitable for use in roofing shingles.

What is claimed is:

1. A roofing shingle comprising:
a substrate; and
a coating on the substrate,
wherein the coating comprises:
10% to 90% by weight of a polymer-modified asphalt composition based on a total weight of the coating,
wherein the polymer-modified asphalt composition comprises:
at least 84% by weight of an asphalt based on a total weight of the polymer-modified asphalt composition;
1% to 15% by weight of a polyolefin based on the total weight of the polymer-modified asphalt composition; and
1% to 15% by weight of an ethylene vinyl acetate copolymer based on the total weight of the polymer-modified asphalt composition,
wherein the ethylene vinyl acetate copolymer has a melt flow index of at least 30 g/10 min as measured according to ISO 1133; and
10% to 90% by weight of at least one filler based on the total weight of the coating; and
a plurality of granules on the coating.

2. The roofing shingle of claim 1, wherein the substrate comprises at least one of a fiberglass mat, a polyester mat, or any combination thereof.

3. The roofing shingle of claim 1, wherein the polyolefin comprises at least one of a polyethylene, a polypropylene, or any combination thereof.

4. The roofing shingle of claim 1, wherein the polyolefin has a number average molecular weight of at least 25 kDa.

5. The roofing shingle of claim 1, wherein the polyolefin has a polydispersity index of 10 or less.

6. The roofing shingle of claim 1, wherein the ethylene vinyl acetate copolymer has a melt flow index of 30 g/10 min to 150 g/10 min as measured according to ISO 1133.

7. The roofing shingle of claim 1, wherein the ethylene vinyl acetate copolymer comprises 10% to 40% by weight of vinyl acetate based on a total weight of the ethylene vinyl acetate copolymer.

8. The roofing shingle of claim 1, wherein the polymer-modified asphalt composition comprises 84% to 95% by weight of the asphalt based on a total weight of the polymer-modified asphalt composition.

9. The roofing shingle of claim 1, wherein the polymer-modified asphalt composition comprises 1% to 10% by weight of the polyolefin based on a total weight of the polymer-modified asphalt composition.

10. The roofing shingle of claim 1, wherein the polymer-modified asphalt composition comprises 1% to 10% by weight of the ethylene vinyl acetate copolymer based on a total weight of the polymer-modified asphalt composition.

11. The roofing shingle of claim 1, wherein the polymer-modified asphalt composition does not comprise a styrene-containing polymer.

12. The roofing shingle of claim 1, wherein the at least one filler comprises limestone.

13. The roofing shingle of claim 1, wherein the polymer-modified asphalt composition has a softening point of 190° F. to 320° F., as measured according to ASTM D3462.

14. The roofing shingle of claim 1, wherein the polymer-modified asphalt composition has a penetration point of 15 dmm or greater at 77° F.

15. The roofing shingle of claim 1, wherein the polymer-modified asphalt composition has a viscosity of 150 cP to 1000 cP as measured according to ASTM D4402 at 400° F.

16. A roofing system comprising:
a roof substrate;
a first roofing shingle; and
a second roofing shingle;

wherein the first roofing shingle and the second roofing shingle are secured to the roof substrate;

wherein a portion of the first roofing shingle overlaps a portion of the second roofing shingle;

wherein each of the first roofing shingle and the second roofing shingle comprises:

a substrate; and a coating on the substrate, wherein the coating comprises:

10% to 90% by weight of a polymer-modified asphalt composition based on a total weight of the coating, wherein the polymer-modified asphalt composition comprises:

at least 84% by weight of an asphalt based on a total weight of the polymer-modified asphalt composition;

1% to 15% by weight of a polyolefin based on the total weight of the polymer-modified asphalt composition;

1% to 15% by weight of an ethylene vinyl acetate copolymer based on the total weight of the polymer-modified asphalt composition, wherein the ethylene vinyl acetate copolymer has a melt flow index of at least 30 g/10 min as measured according to ISO 1133;

10% to 90% by weight of at least one filler based on the total weight of the coating; and a plurality of granules on the coating.

17. The roofing system of claim 16, wherein the polyolefin has a polydispersity index of 10 or less.

18. The roofing system of claim 16, wherein the ethylene vinyl acetate copolymer has a melt flow index of 30 g/10 min to 150 g/10 min as measured according to ISO 1133.

19. The roofing system of claim 16, wherein the ethylene vinyl acetate copolymer comprises 10% to 40% by weight of vinyl acetate based on a total weight of the ethylene vinyl acetate copolymer.

20. The roofing system of claim 16, wherein the polymer-modified asphalt composition comprises 84% to 95% by weight of the asphalt based on a total weight of the polymer-modified asphalt composition.

* * * * *